United States Patent [19]

Hatono et al.

[11] Patent Number: 5,737,314
[45] Date of Patent: Apr. 7, 1998

[54] ATM EXCHANGE, ATM MULTIPLEXER AND NETWORK TRUNK APPARATUS

[75] Inventors: Atsuo Hatono; Masashi Hiraiwa, both of Yokohama, Japan

[73] Assignee: Hitachi, Ltd., Tokyo, Japan

[21] Appl. No.: 663,981

[22] Filed: Jun. 14, 1996

[30] Foreign Application Priority Data

Jun. 16, 1995 [JP] Japan ................................. 7-150493

[51] Int. Cl.[6] ............................................ H04L 12/56
[52] U.S. Cl. ......................... 370/235; 370/412; 340/825.5
[58] Field of Search ................................... 370/232, 235, 370/355, 395, 398, 399, 412, 413, 414, 427; 340/825.5

[56] References Cited

U.S. PATENT DOCUMENTS

| | | | |
|---|---|---|---|
| 5,189,668 | 2/1993 | Takatori et al. | 370/60 |
| 5,367,520 | 11/1994 | Cordell | 370/60 |
| 5,402,426 | 3/1995 | Foglar et al. | 371/20.1 |
| 5,530,698 | 6/1996 | Kozaki et al. | 370/60.1 |
| 5,541,912 | 7/1996 | Choudhury et al. | 370/17 |
| 5,544,168 | 8/1996 | Jeffrey et al. | 370/60.1 |
| 5,557,607 | 9/1996 | Holden | 370/58.2 |
| 5,557,609 | 9/1996 | Shobatake et al. | 370/60.1 |
| 5,577,035 | 11/1996 | Hayten et al. | 370/60 |

FOREIGN PATENT DOCUMENTS

| | | | |
|---|---|---|---|
| 4-179338 | 6/1992 | Japan | H04L 12/48 |
| 5-304536 | 11/1993 | Japan | H04L 12/48 |

OTHER PUBLICATIONS

A Congestion Control for Frame Relay-ATM Interworking, The Technical Report of the Institute of Electronics, Information and Communication Engineers of Japan, SSE93-30 (1993, Jul.).

A Cell Loss Approximation Method Applicable for ATM Traffic of which Burst Length are Depend on General Distributions, The Technical Report of the Institute of Electronics, Information and Communication Engineers of Japan, SSE94-242 (1995, Mar.).

J.A. Bucklew, Large Deviation Techniques in Decision, Simulation and Estimation, John Wiley & Sons, Inc. (1990).

*Primary Examiner*—Hassan Kizou
*Assistant Examiner*—A. Bnmmoussa
*Attorney, Agent, or Firm*—Antonelli, Terry, Stout, & Kraus, LLP

[57] ABSTRACT

An ATM switch system having a traffic control function to reduce cell loss probability and delay of cells communicated through a network to be equal to or less than acceptable values, respectively. To achieve traffic control function, the invention provides a circuit to observe the queue of cells in the buffer, and an overflow testing circuit for obtaining a distribution of the queue size according to observed values of the queue and testing to decide, according to the distribution, whether an event has occurred that the cell loss probability is shifted due to the input cells to a distribution related to a cell loss probability exceeding an upper-limit value of acceptable cell loss probability. The invention also provides an underflow testing circuit for testing, according to the distribution, whether an event has occurred that the cell loss probability is shifted to a distribution related to a cell loss probability less than a lower-limit value of acceptable cell loss probability such that the read delay and interval of input cells are altered according to outputs from the overflow and underflow testing circuits.

13 Claims, 24 Drawing Sheets

DIFFERENCE IN CELL LOSS PROBABILITY CHARACTERISTIC

FIG.5
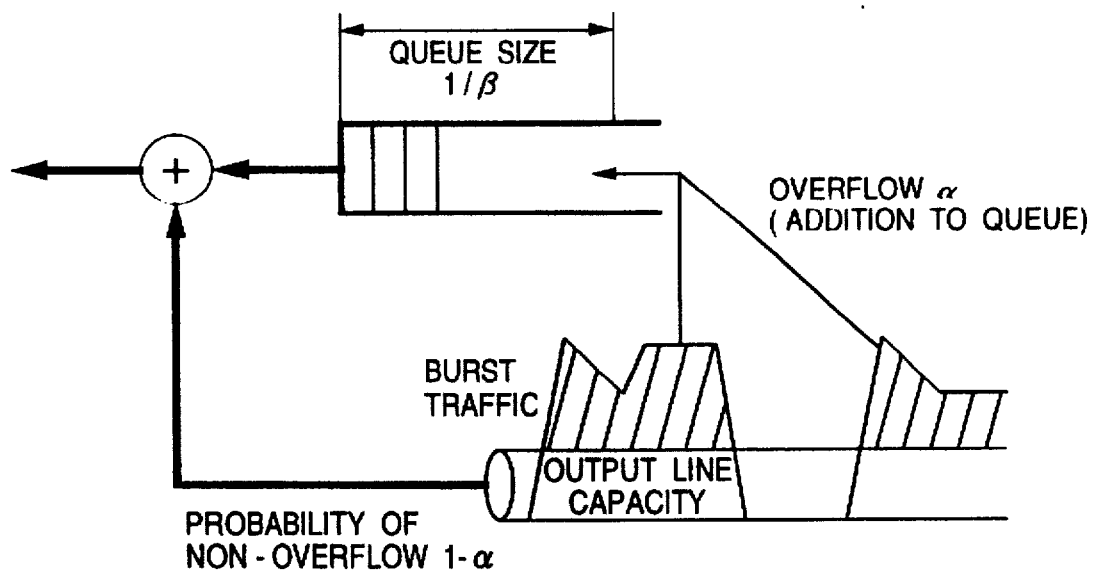
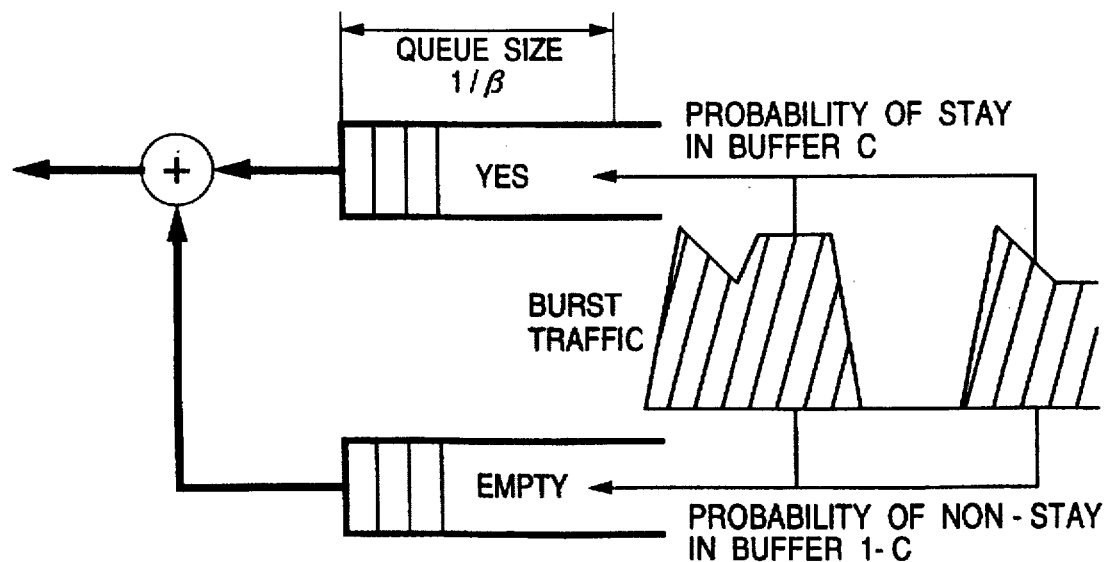

FIG.19A

CALL SETUP MESSAGE ⟋11

| MSG ID | VCI | SOURCE ADDRESS | DESTINATION ADDRESS | TRAFFIC DESCRIPTOR | TRAILER |
|---|---|---|---|---|---|

FIG.19B

RESPONSE MESSAGE ⟋12

| MSG ID | VCI | NODE ADDRESS | TRAILER |
|---|---|---|---|

FIG.19C

RELEASE MESSAGE ⟋13

| MSG ID | VCI | NODE ADDRESS | TRAILER |
|---|---|---|---|

FIG.19D

OVERFLOW MESSAGE ⟋14

| MSG ID | VCI | NODE ADDRESS | TRAILER |
|---|---|---|---|

FIG.19E

UNDERFLOW MESSAGE ⟋15

| MSG ID | VCI | NODE ADDRESS | TRAILER |
|---|---|---|---|

ATM EXCHANGE, ATM MULTIPLEXER AND NETWORK TRUNK APPARATUS

BACKGROUND OF THE INVENTION

The present invention relates to the construction of an asynchronous transfer mode (hereinafter referred to as ATM) switch system for use in an ATM network conducting communication in the asynchronous transfer mode, and in particular, to the construction and a traffic control method of an ATM switch system having a function to conduct a congestion sensing operation stipulated according to Recommendation I 371 (I. 371) of the International Telecommunication Union (hereinafter referred to as ITU).

In a communication network adopting the asynchronous transfer mode, to fully develop the high transmission speed of the transmission path, a communicating apparatus on a transmission side successively transfers data items (cells) to a communicating apparatus on a reception side without confirming acknowledgement of the cell transfer from the reception side. Therefore, in the apparatus on the reception side, there occurs a case in which cells are received at the same time from a plurality of communicating apparatuses on the transmission side and hence some of the received cells are discarded. To completely suppress the discarding of cells, although it is only necessary to provide an infinite number of buffers for cells to be received, this scheme is not realistic. In this situation, the ATM communication network is provided with a traffic control as follows. The cell loss probability and delay of cells in the communication apparatus are beforehand set for each user such that cells are communicated according to the values set for the respective users. There is also disposed a control function to set the traffic of cells thus communicated to a value within a certain acceptable range so that the overall traffic of the network satisfies the acceptable communication service qualities (for the cell loss and delay). As an example of implementation of the traffic control function, there has been known the configuration described in the JP-A-5-304536 in which the cell loss probability is directly observed to sense an event that the probability exceeds an acceptable cell loss probability beforehand specified.

In general, to control the rate of traffic flow from terminal facilities, it is desirable that occurrence of an event in which the cell loss probability exceeds the acceptable cell loss probability is sensed within about one second to activate a control operation to reduce the average cell rate and burst size. For example, when the output line capacity is 150 Mbps, the period of time necessary to transmit one cell is about 2.7 microseconds. On this occasion, assuming the cell loss probability is $1/10^4$ (* indicates exponent and hence $10^4$ means ten to the fourth power; this expression used herebelow in this meaning), there occurs an event in which 100 cell losses appear per about one second on average. For the cell loss probability of this level, it is possible even in the configuration described in the publication above that the occurrence of the event in which the cell loss probability exceeds the acceptable cell loss probability can be sensed by directly observing the cell loss probability.

However, in a recent ATM network having a characteristic stipulated by the ITU, the cell loss probability of the level ranging from $1/10^9$ to $1/10^{11}$ is required to be guaranteed. For the cell loss probability of this level, the mean occurrence cycle of the cell loss is at least one hour. Consequently, to conduct the cell loss observation, for example, about ten times, the observation cycle is set to ten or more hours. This means that it is substantially impossible to sense the occurrence of the event in which the cell loss probability exceeds the acceptable cell loss probability by directly observing the cell loss probability at the level ranging from $1/10^9$ to $1/10^{11}$. In other words, the construction in which the cell loss probability is directly observed to reduce the mean cell rate and burst size when the event in which the cell loss probability exceeds the acceptable cell loss probability is sensed cannot be simply introduced to the practical cases when the cell loss probability is at the level ranging from $1/10^9$ to $1/10^{11}$.

In consequence, in the configuration in which the traffic control function of the ATM switch system is practically operated, there is generally employed a configuration in which the flow rate control is executed on the rate basis. In this configuration, an observed event in which a cell queue size exceeds a designated value once or successively a plurality of times in a buffer is defined as an event of congestion, and when an event in which the cell queue size is less than a value other than the designated value is observed once or successively a plurality of times, the state is defined as recovery of congestion. Under this condition, when the cell queue size exceeds the designated value (at congestion), the peak cell rate is reduced or the cell transmission is stopped; whereas, when the cell queue size is equal to or less than the value other than the designated value (at recovery of congestion), the peak cell rate is recovered to the original value or the cell transmission is re-started. As an example of the rate control on the rate basis, there has been known the structure described in an article "A Congestion Control for Frame Relay-ATM Interworking", the Technical Report of the Institute of Electronics, Information and Communication Engineers, Exchange System Group SSE93-30 (1993-7)). Additionally, as a variation of the configuration above, there has been known the configuration described in the JP-A-4-179338 in which the state of congestion is detected by sensing occurrence of an event in which the mean queue size exceeds a fixed threshold value. Incidentally, the traffic control function of the prior art in which the rate-base flow control method is adopted has been proposed on assumption that the buffer size is about 100 cells in the ATM switch system. Namely, the flow rate control is accomplished such that when the cell queue size exceeds a designated value, the peak cell rate is reduced or the cell transmission is stopped to reduce the cell loss probability, and when the cell queue size is equal to or less than a value other than the designated value, the peak cell rate is recovered to the original value or the cell transmission is re-started.

The cell loss occurs in the ATM switch system due to collisions between cell queues (to be simply called bursts herebelow) arriving thereat in the burst-like state. FIG. 1 shows the system configuration as a model of the ATM switch system for explanation of the traffic control function according to the present invention. In this diagram, the ATM switch system receives via input lines having an input line capacity of Vi such signals having mutually different characteristics as a voice signal, a picture signal, and data communicated between terminal facilities in the unit of Ni signals. The signals have i types of traffic characteristics represented as average cell rate <vi>, peak cell rate vi, mean burst size $1/\mu i$, and burst length fluctuation Ci. In operation of exchange, the input signals are sent to output lines having output line capacity of V and utilization ρ. There are provided x-cell buffers for the respective output lines to accumulate collided cells therein. When the burst size (buffer size) x corresponds to an arbitrary distribution and the burst interval is related to an exponential distribution, the cell loss probability Ploss is expressed as follows.

$$Ploss(x) = Ploss1(x) + Ploss2(x) + Ploss3(x) + Ploss4(x) \qquad (1)$$
$$= 0.4(\alpha 0 - \alpha)\exp(-3\beta 0 x) + 0.6\beta 0(\alpha 0 - \alpha)\exp(-\beta 0 x) + 0.4\alpha\exp(-3\beta x) + 0.6\alpha\exp(-\beta x)$$

In expression (1), $\alpha 0$ indicates a cell overflow probability of cells inputted to the buffer due to cell collision, $\alpha$ denotes a burst overflow probability of cells inputted to the buffer due to cell collision, $\beta 0$ stands for a parameter of cuesize by burst collision indicating the queue size resultant from cell collision, $1/\beta$ represents a parameter of cuesize designating the queue size, which are expressed as follows.

$$\alpha 0 = 0.5 \cdot \rho \cdot (1 - 1/\Sigma Ni) \qquad (2)$$

$$\alpha = \Sigma NCr \cdot (rv-V) \cdot (<v>/v)^* r (1-<v>/v)^*(N-r) \qquad (3)$$

where, $\Sigma$ is the total for V ranging from $rv$ to $N$.

$$\beta 0 = \mu 0 \cdot (1-\rho)/(1-1/\Sigma Ni) \qquad (4)$$

$$\beta = \mu \cdot (1-\rho)/(1-V/(N \cdot v)) \qquad (5)$$

In this connection, $<v>$, $v$, $N$, $1/\mu 0$, and $1/\mu$ of expressions (2) to (5) respectively indicate the effective average cell rate, effective peak cell rate, effective connection number, effective average cell size, and effective mean burst size, which are expressed as follows.

$$<v> = \Sigma(Ni \cdot <vi> \cdot (vi - <vi>))/\Sigma(Ni \cdot (vi - <vi>)) \qquad (6)$$

$$v = (\Sigma(Ni \cdot <vi> \cdot (vi - <vi>))) \cdot \Sigma(Ni \cdot vi)/(\Sigma(Ni \cdot (vi - <vi>))) \cdot \Sigma(Ni \cdot <vi>) \qquad (7)$$

$$N = (\Sigma(Ni \cdot (vi - <vi>))) \cdot \Sigma(Ni \cdot <vi>)/(\Sigma(Ni \cdot <vi> \cdot (vi - <vi>))) \qquad (8)$$

$$1/\mu 0 = (\Sigma(Ni \cdot <vi> \cdot (1 - <vi>/Vi) \cdot (1 - vi/Vi)))/2 \cdot (\Sigma(Ni \cdot <vi>)) \qquad (9)$$

$$1/\mu = \Sigma(Ni \cdot <vi> \cdot (1 - <vi>/Vi) \cdot ((1 - Ci)/(2 \cdot \mu i)))/(\Sigma(Ni \cdot <vi>)) \qquad (10)$$

$$\rho = (\Sigma(Ni \cdot <vi>))/V \qquad (11)$$

In this regard, expression (1) is obtained by expanding, for application thereof to the heterogeneous traffic, the expression proposed by the inventor of the present invention in "A cell Loss Approximation Method Applicable for ATM Traffic of which Burst Length are Depend on General Distributions", the Technical Report of the Institute of Electronics, Information and Communication Engineers, Exchange System Group, SSE94-242 (1995-03). The burst interval of the actual traffic does not necessarily correspond to an exponential distribution. However, according to the large deviation principle described, for example, in "Large Deviation Techniques in Decision, Simulation and Estimation" written by J. A. Bucklew and published from John Wiley & Sons, Inc. in 1990, it has been known that the tail portion of the general probability distribution for which the law of large numbers holds is asymptotic with respect to an exponent function. Consequently, it can be considered that the cell loss probability represented by expression (1) qualitatively shows, even in a case in which the burst interval is not associated with an exponential function, a behavior similar to that developed when the burst interval is related to an exponential distribution.

FIGS. 2 and 3 are graphs respectively showing curves of the cell loss probability indicated by expression (1). The cell loss probability of the ATM switch system shown in the model of FIG. 1 with the abscissa and ordinate representing the buffer size (logarithmic value) and cell loss probability (logarithmic value). As shown in FIG. 2, since an ordinary ATM switch system includes buffers for at least several tens of cells, it will be understood that the first term Ploss1(x) and second term Ploss2(x) of expression (1) are ignorable and the cell loss probability depends on the third term Ploss3(x) and fourth term Ploss4(x), and hence the relationship between the buffer size (logarithmic value) and the cell loss probability (logarithmic value) is drawn as substantially a straight line. Moreover, when the buffer size becomes larger, the cell loss probability depends only on the fourth term Ploss4(x) and hence is represented as a straight line. Incidentally, Ploss3(x) designates the cell loss taking place because the queue is gradually elongated due to the reduced number of burst collisions, and Ploss4(x) means the cell loss caused by an abrupt elongation of the queue due to a large number of burst collisions. Furthermore, it can be seen from FIG. 3 that as the buffer size is enlarged, the value of cell loss probability depends much more on the average queue size $1/\beta$ appearing when cells are inputted to the buffer.

In the ATM switch system provided with the traffic control function using the rate-base control operation described in the articles above, the mean burst size is assumed to take a value of from about ten cells to about 100 cells and hence the buffer disposed in the construction has a buffer size of about 100 cells. For example, in an ATM switch system having buffers of the buffer size ranging from 50 cells to 100 cells operating with a utilization of 0.7 and an input traffic in which the burst size is 50 cells, i.e., is related to a fixed distribution, the burst interval is associated with an exponential distribution, the cell loss probability values are respectively obtained as 0.06>Ploss3>0.01 and 0.32>Ploss4>0.18. This indicates that when the buffer size is about 100 cells, there still occurs a large cell loss and the reduction of cell loss probability due to the buffering effect of the buffers is not remarkable. Additionally, it can be seen from FIGS. 2 and 3 that there are provided the following characteristics.

(1) Cell loss Ploss3 caused by the gradual elongation of the queue size due to the reduced number of burst collisions and cell loss Ploss4 occurring because of the abrupt increase in the queue size due to the large number of burst collisions take large numbers. For the cell loss Ploss4 occurring because of the abrupt increase in the queue size, even when a control operation is effected after the detection of the event to reduce the peak cell rate, it is difficult to control the cell loss because of the delay in response. However, the loss Ploss3 caused by the gradual elongation of the queue size can be controlled. Since the cell loss probability can be reduced by controlling only Ploss3, the rate-base control is accomplished for the reduction of cell loss probability described above in an ATM switch system including buffers of which the buffer size is about 100 cells.

(2) Even when $\beta$ denoting the burst-level queue size is altered, the cell loss probability is not remarkably changed and takes a large value as above. However, since the buffer size is small, i.e., about 100 cells, when the observed queue size of cells in the buffer exceeds a designated value, it is quite probable that cells overflow the buffer (the cell loss takes place). Namely, an event that the queue size exceeds the designated value means the occurrence of cell loss. Therefore, the traffic control may be carried out in a manner such that whether or not the queue size exceeds the designated value is sensed to decide occurrence of the cell loss.

(3) Since the buffer size is small, the peak cell rate is the parameter dominating the cell loss and the cell loss can be suppressed by achieving the traffic control with respect to the peak cell rate.

On the other hand, assume that the ATM switch system is so configured to include large-capacity buffers having a buffer length of about 1000 cells. When the exchange is operated under a condition similar to that of the above example with the buffer size set to a value ranging from 500 cells to 1000 cells, there are obtained small values for the cell loss probability as $9.14/10^{*}9 > Ploss3 > 9.28/10^{*}7$ and $1.49/10^{*}3 > Ploss4 > 3.69/10^{*}6$. This indicates that the reduction in the cell loss probability due to the buffering effect of the buffers is remarkable. In addition, the cell loss probability depends only on the cell loss Ploss4 caused by the abrupt increase in the queue size due to the large number of burst collisions; moreover, the probability depends on the mean queue size of cells inputted to the buffer. Additionally, it can be understood from FIGS. 2 and 3 that there are provided the following characteristics.

(1) The cell loss depends on the cell loss Ploss4 occurring because of the abrupt increase in the queue size due to the large number of burst collisions. Consequently, as already described, even when a control operation is effected after the detection of the event to reduce the peak cell rate, it is difficult to control the cell loss because of the delay in response.

(2) As shown in FIG. 3, when $\beta$ denoting the burst-level queue size is altered, the cell loss probability is remarkably changed. However, when the buffer size is large and the next cell burst is short, there occurs an event in which cells are processed and hence the queue size becomes small. Consequently, unlike in the case of the small buffer size, an event in which the observed queue size of cells in the buffer exceeds the designated value does not necessarily means an event in which cells overflow the buffer (occurrence of the cell loss). That is, an event that the queue size exceeds the designated value does not mean the occurrence of cell loss. Therefore, it is impossible to carry out the traffic control in which only whether or not the queue size exceeds the designated value is sensed for the decision of the occurrence of cell loss.

(3) Since the buffer size is large, the average cell rate and burst size are parameters dominating the cell loss. Namely, even when the traffic control is accomplished with respect to the peak cell rate, it is difficult to suppress the cell loss, and the traffic control is required to be conducted with respect to the average cell rate and burst size.

As described above, in the ATM switch system adopting large-capacity buffers, it is difficult to achieve the traffic control in which the occurrence of cell loss is assumed by sensing only whether or not the queue size exceeds the designated value as in the conventional exchange. It is desirable that the cell loss probability is observed to sense whether or not the cell loss probability exceeds the acceptable cell loss probability of the terminal facility or the system; alternatively, it is desirable to sense the occurrence of an event in which a cell delay exceeds an acceptable cell delay so as to reduce the average cell rate and burst size.

However, as already described, to directly observe the cell loss probability at the level ranging from $1/10^{*}9$ to $1/10^{*}11$ necessary for the ATM switch system, there is required a long period of observation; furthermore, even when the traffic control is accomplished according to the result of observation, the operation is carried out after the occurrence of the cell loss and hence the response is too late, leading to, for example, a situation in which the cell loss cannot be necessarily suppressed. In consequence, the configuration in which the cell loss probability is directly observed is not realistic.

SUMMARY OF THE INVENTION

It is therefore an object of the present invention to provide an ATM switch system and a network using the same in which in a system including an ATM network of a required cell loss probability of a level ranging from $1/10^{*}9$ to $1/10^{*}11$, there is implemented a function to indirectly sense occurrence of an event in which the cell loss probability exceeds the acceptable cell loss probability, the function being equivalent to that developed when the cell loss probability is directly observed. Moreover, there is implemented a function to indirectly sense occurrence of an event in which the cell delay exceeds the acceptable cell delay. The ATM switch system includes a traffic control function in a configuration to timely activate the control operation to reduce the average cell rate and burst size according to the results of sense operations above.

Specifically, the object of the present invention is to provide an ATM switch system and a network using the same including a traffic control function. There are implemented a function in which the queue size of cells is observed in a short period of time similar to that of the conventional ATM switch system to statistically test and/or to identify occurrence of the event in which the cell loss probability exceeds the acceptable cell loss probability according to the result of observation (the statistically testing and identifying operations are to be collectively referred to as a statistically testing operation herebelow) and a function to sense an event in which the cell delay exceeds the acceptable cell delay. The traffic control function is so configured to timely activate the control operation to reduce the average cell rate and burst size according to the result of the statistical test.

Additionally, the object of the present invention is to provide the statistical test function in a simple configuration to be easily applied to ATM switch systems of various configurations.

In order to achieve the objects above, there is provided an ATM switch system according to the present invention including statistical test circuit in which the queue size of cells inputted to the buffer is observed to attain a probability density function of the queue size according to the observed value so as to statistically test to decide according to the probability density function whether the cell loss probability exceeds the acceptable cell loss probability (occurrence of congestion) or not (congestion not occurred or recorded). According to the output from the statistic test circuit, it is decided whether or not the cell loss probability of cells inputted to the ATM switch system exceeds the acceptable cell loss probability. If it is decided that the acceptable cell loss probability is exceeded, the average cell rate and burst size of the cells inputted thereto are controlled.

The statistic test circuit is implemented by taking advantage of an event that when the distribution form of the probability distribution function is analytically known, since the parameters of the probability distribution are estimated according to the respective observed values, the overall probability distribution function can be statistically tested and an event that the cell loss probability and delay distribution can be attained from the queue size probability distribution. Next, description will be given of an outline of operation of the statistical test means (the principle and configuration will be described in detail in conjunction with the detailed description of the present invention).

FIG. 4 is a graph of a curve showing the probability density function f(x) of the cell queue size in the buffer of the ATM switch system of FIG. 1 in which the probability density function f(x) of the cell queue size are drawn with the abscissa and ordinate respectively representing the queue size (logarithmic value) and the occurrence probability (logarithmic value). In addition, FIG. 5 is an explanatory diagram for explaining a relationship between the cell loss probability and the probability density function of cell queue and FIG. 6 is a graph of curves for explaining a relationship between the cell loss probability and the probability density function of cell queue in which both of the cell loss probability and the probability density function of cell queue are drawn with the abscissa and ordinate respectively representing the buffer size and queue size (each in a logarithmic value) and the cell loss probability and probability density function of cell queue size (each in a logarithmic value). Although details thereabout will be described later, the characteristic of the probability density function f(x) depends, in the range in which the burst level is large, on probability C of occurrence of the burst-level queue and burst-level queue size $\beta$ as shown in FIG. 4. In the graph, parameter $\beta$ is a parameter to indicate the queue size used in expression (1). Additionally, as shown in the explanatory diagram of FIG. 5, probability C which is a parameter of the probability density function indicates the quantity of cells (queue) staying in a pertinent buffer, the quantity being represented by a probability of occurrence of a queue having a predetermined size in the buffer. This corresponds to the quantity of cells (overflow cells) inputted to a buffer due to a cell collision, namely, to output line overflow probability $\alpha$ representing a ratio of cells inputted to the buffer due to the burst collision according to expression (1). More specifically, when probability C of occurrence of the queue having the predetermined size due to the burst is beyond the range of assumed or designated values of the ATM switch system, output line overflow probability $\alpha$ representing a ratio of cells inputted to the buffer due to the burst collision is also beyond the range of designated values of the ATM switch system.

FIG. 6 is an explanatory diagram for more clearly showing the correspondence (relationship) between the cell loss probability represented by expression (1) and the probability density function of queue size (which will be described later). As can be seen from FIG. 6, the cell loss probability is represented by a curve with intercept log $\alpha$ of the asymptotic line and gradient $\beta$ in the zone of a large buffer size and the probability density function of queue is represented by a curve with intercept log C of the asymptotic line and gradient $\beta$ in the zone of a large queue size such that the cell loss characteristic curve and queue probability density function are represented by substantially straight lines, which are almost parallel to each other. As described above, the probability probability C of occurrence of the burst-level queue corresponds to outline overflow probability $\alpha$ indicating a ratio of cells inputted to the buffer due to the burst collision; moreover, both characteristics depend on parameter $\beta$ denoting the size of the same queue. Consequently, in an ATM switch system having a large buffer size, without conducting the direct observation of the cell loss probability, the queue size of cells in the buffer is only required to be observed to attain, according to the queue size, probability C of occurrence of the burst-level queue and parameter $\beta$ designating the average queue size so as to statistically test probability density function of the queue f(x), thereby obtaining output line overflow probability $\alpha$ indicating a ratio of cells inputted to the buffer and parameter $\beta$ indicating the average queue size as represented by expression (1). Thereafter, it is only required to decide whether or not these values are respectively beyond the designated values of the ATM switch system, namely, whether or not the cell loss probability exceeds the acceptable cell loss probability.

In the statistic test means, the cell queue size is observed to attain the probability density function of cell queue so as to statistically test the cell loss probability of cells inputted to the ATM switch system according to the probability density function. The cell loss probability can be known without directly measuring the cell loss probability. That is, the configuration of the ATM switch system and network of the present invention includes the statistic test means in which according to the observed value of the cell queue size, for example, the observed value of queue size for the frequency level 1/10*4 of the queue having a queue size exceeding a predetermined queue size, there are obtained probability C of occurrence of the burst-level queue and parameter $\beta$ denoting the queue size such that a statistic test is conducted for the values of probability C and parameter $\beta$ to statistically test to decide whether or not the traffic characteristic of cells inputted to the system is beyond the values corresponding to the acceptable cell loss probability and acceptable delay probability, thereby controlling the traffic of the inputted cells.

More specifically, the ATM switch system of the present invention includes a circuit to observe the queue size of cells, statistic test means including an overflow test circuit to decide, according to the observed value of the queue size, presence or absence of occurrence of an event in which the inputted cells cause a cell loss and delay (congestion) respectively exceeding the acceptable cell loss probability and delay value and an underflow test circuit to decide, according to the observed value of the queue size, presence or absence of occurrence of an event in which the inputted cells cause a cell loss and delay (congestion not occurred or congestion recovered) respectively below the acceptable cell loss probability and delay value, and traffic regulation or restriction means including an average cell rate control circuit and a burst size control circuit.

In more detail, each of the overflow and underflow test circuits includes a circuit to calculate probability C of occurrence of the burst-level queue and parameter $\beta$ designating the average queue size and a circuit to compare the results of calculations with the designated values of the acceptable cell loss probability and delay beforehand set to the ATM switch system and system and to sense presence or absence of occurrence of an event in which the inputted cells cause a cell loss and delay respectively over/below the acceptable cell loss probability and delay value.

In the configuration above, when cells are started to be inputted to the ATM switch system, the queue size observation circuit starts operation to observe the queue size. The observed value of queue size is inputted to the overflow test circuit in a periodic fashion. When the observed value of queue size is inputted, the overflow test circuit estimates the probability distribution of queue size. After updating the probability distribution, the circuit checks to decide whether or not the probability distribution is over the designated distribution beforehand set to the circuit. When the probability distribution exceeds the designated distribution, it is assumed that the cell loss probability or delay exceeds the acceptable value to initiate the traffic restriction circuit so as to start operation of restricting the traffic of cells inputted to the exchange.

Also after the operation to regulate the traffic of cells inputted to the exchange, the circuit continuously observes the queue size to estimate the probability distribution of queue size. After updating the probability distribution, the probability distribution is statistically tested to decide whether or not the probability distribution is below the designated distribution set to the circuit in advance. If the probability distribution is below the designated distribution, it is assumed that the cell loss probability and delay are below the acceptable values and the circuit stops operation of the traffic regulation circuit to remove the traffic regulation.

BRIEF DESCRIPTION OF THE DRAWINGS

FIG. 5 is an explanatory diagram for explaining the relationship between the cell loss probability and the probability density function of cell queue.

FIGS. 19A to 19E are message layout diagrams showing the layout of messages communicated using cells handled by the ATM switch system according to the present invention.

DESCRIPTION OF THE PREFERRED EMBODIMENTS

Figure 1:
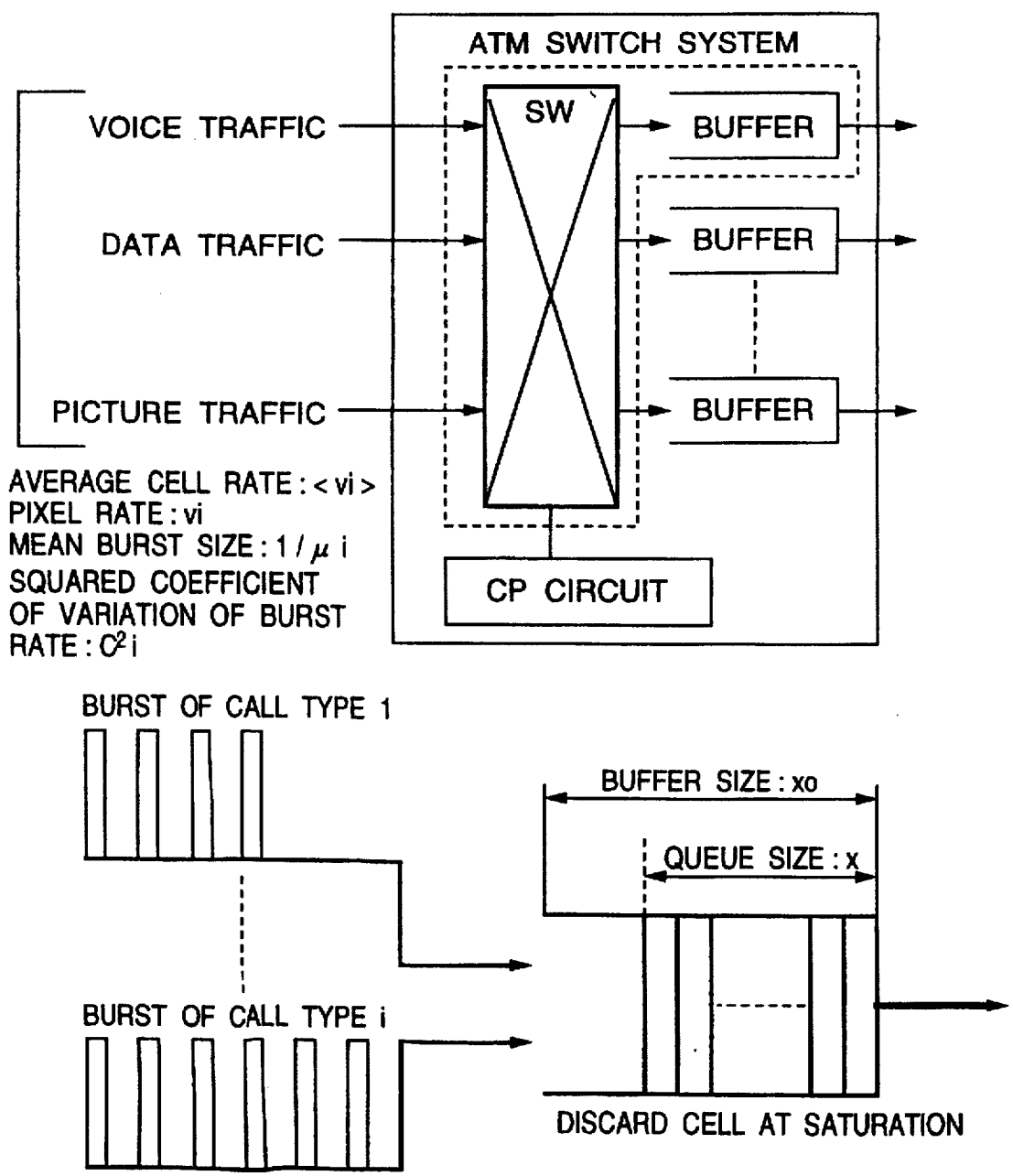
FIG. 1 is a system configuration diagram showing a model of the configuration of the ATM switch system for explaining the traffic control function.
Figure 2:
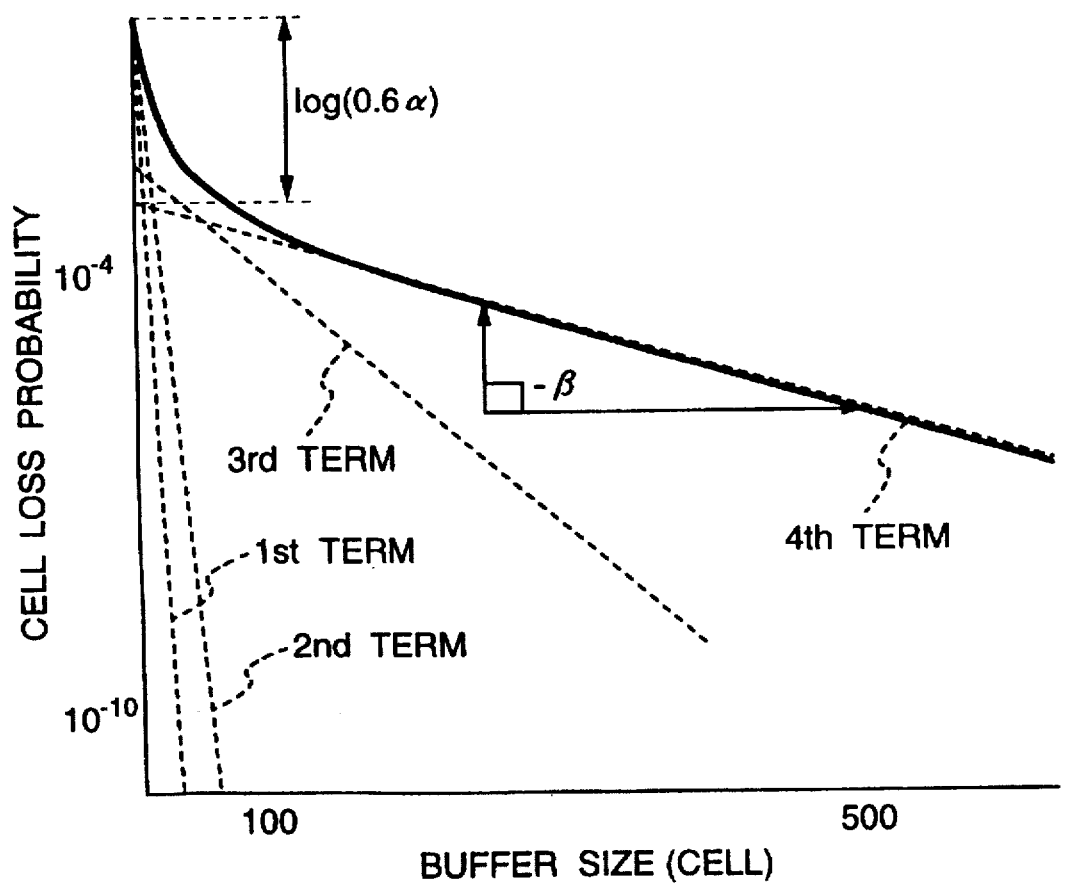
FIG. 2 is a graph showing curves of the cell loss probability of the ATM switch system shown in FIG. 1.
Figure 3:
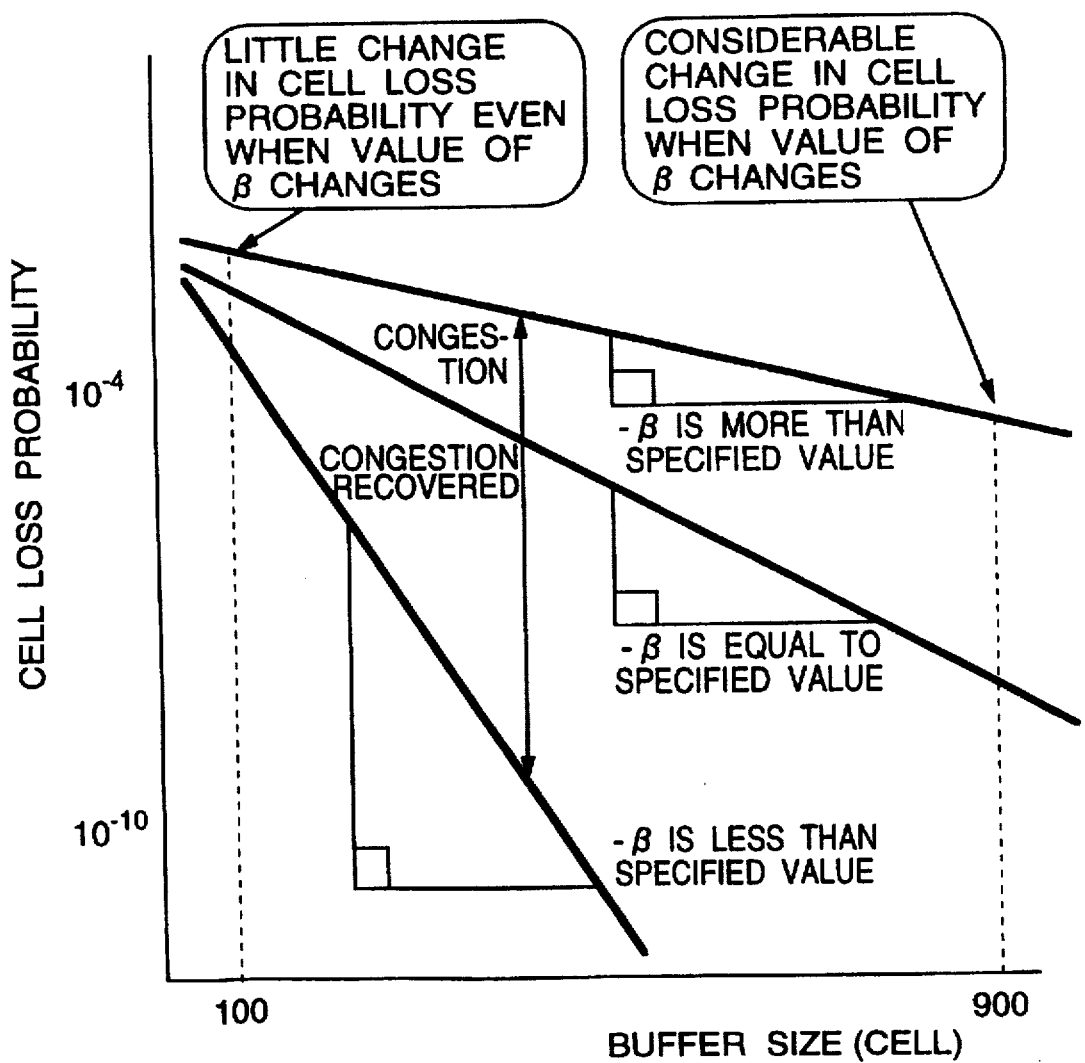
FIG. 3 is a graph also showing curves of the cell loss probability of the ATM switch system.

Referring to the drawings, description will be given in detail of embodiments of the ATM switch system including the traffic control function according to the present invention, a network using the same, and the traffic monitor and control operation. In the following description, the ATM switch system according to the present invention includes a circuit to observe the queue size of cells in the buffer, an overflow test circuit for testing, according to the observed values of queue size, an event in which the distribution of queue size is shifted to a distribution resulting in a cell loss probability exceeding an acceptable or acceptable cell loss probability, and an underflow test circuit for testing, according to the observed values of queue size, occurrence of an event in which the distribution of queue size is shifted to a distribution resulting in a cell loss probability below the acceptable cell loss probability. When the overflow test circuit decides, as a result of the test according to the observed values of queue size, occurrence of an event in which the cell loss results in a cell loss (occurrence of congestion) exceeding the acceptable value, the traffic regulation or restriction circuit is activated. On the other hand, during the traffic regulation, when the underflow test circuit decides, as a result of the test according to the observed values of queue size, occurrence of an event in which the cell loss results in a cell loss (recovery of congestion) below the acceptable value, the traffic restriction circuit is stopped. Namely, through the sequence of operations, the traffic monitor and control operation is effected such that the cells (traffic) inputted to the exchange and network are adjusted so that the cell loss and delay are respectively within the ranges of acceptable values determined by the system.

Figure 7:
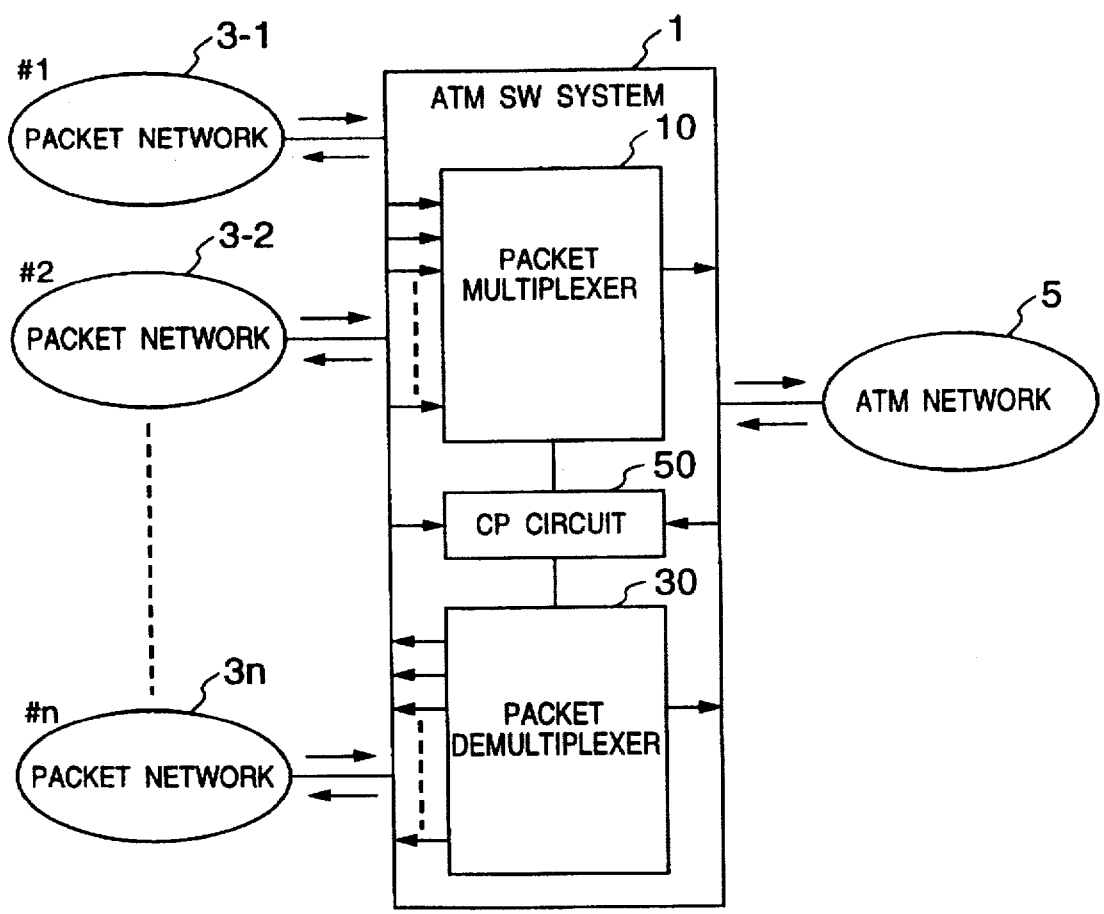
FIG. 7 is a network construction diagram showing a configuration example of the network using the ATM switch system according to the present invention.
Figure 8:
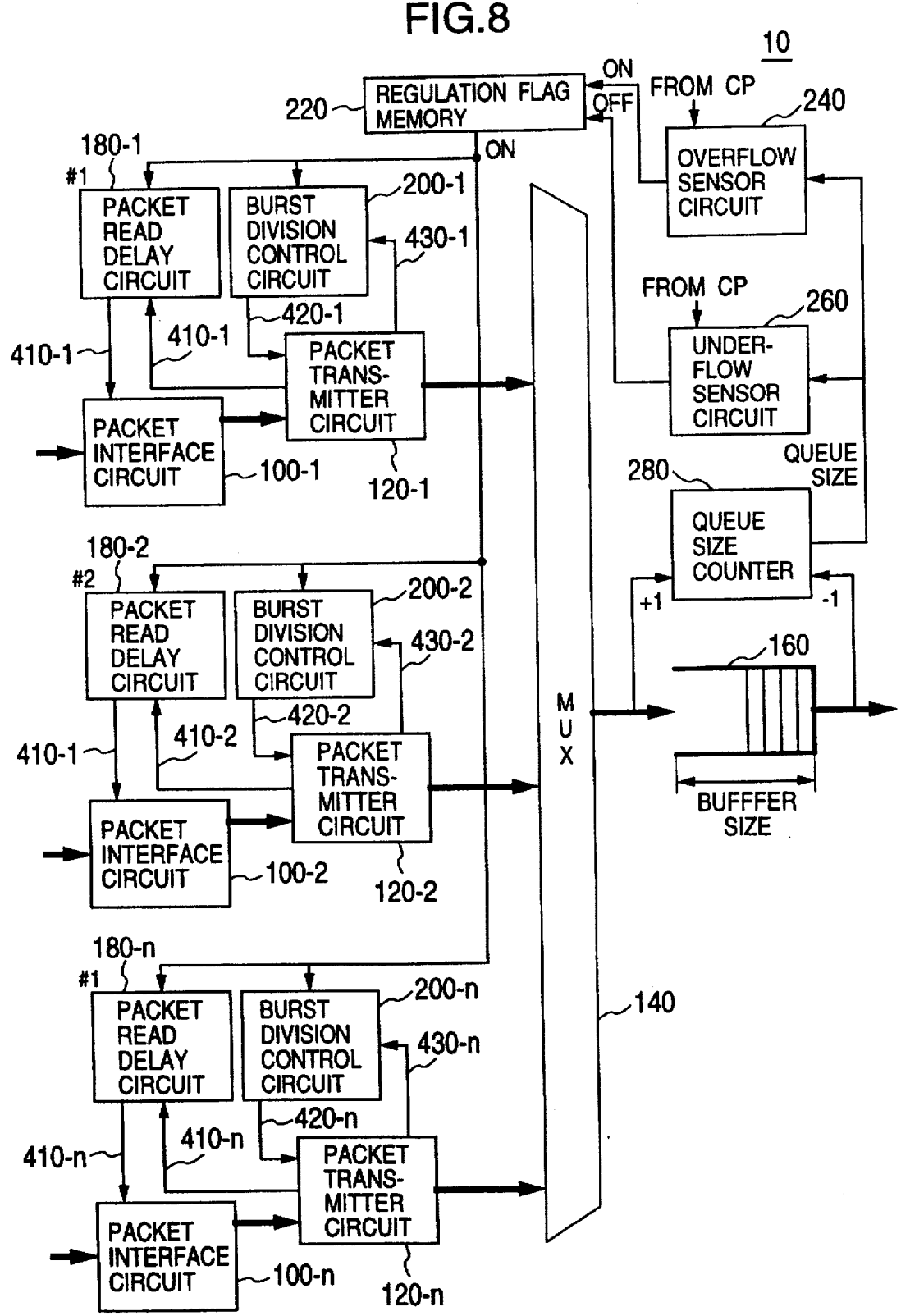
FIG. 8 is a block diagram showing the configuration of a packet multiplexer employed in the ATM switch system according to the present invention.
Figure 9:
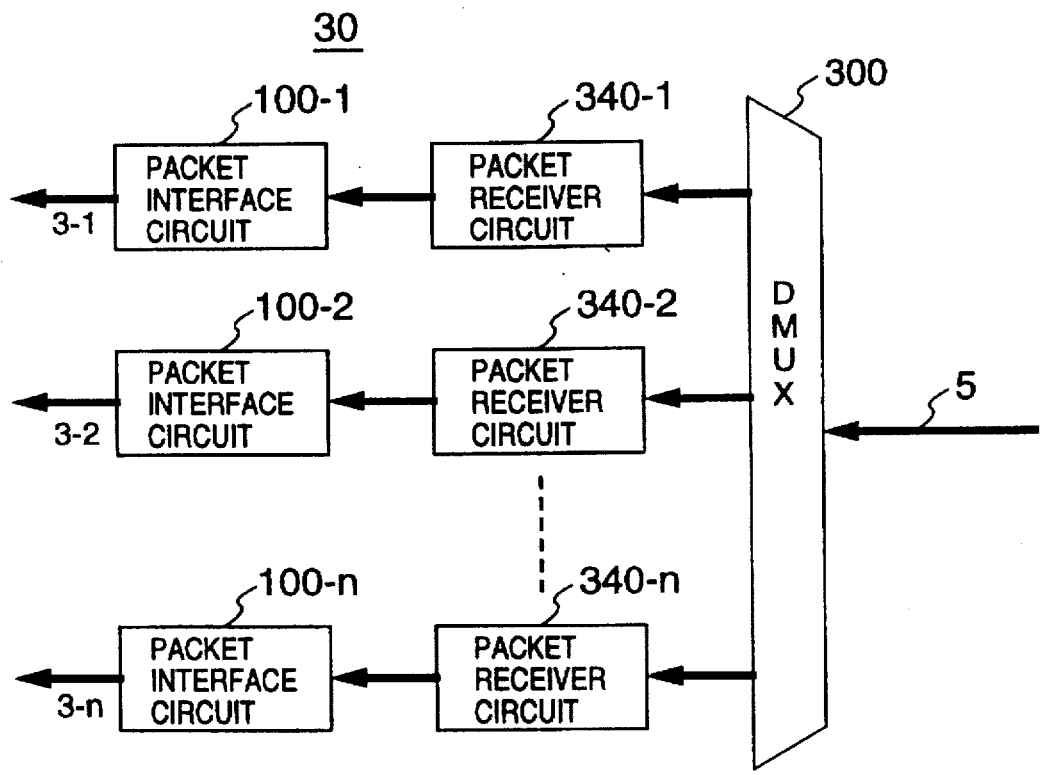
FIG. 9 is a block diagram showing the configuration of a packet demultiplexer employed in the ATM switch system according to the present invention.
Figure 10:
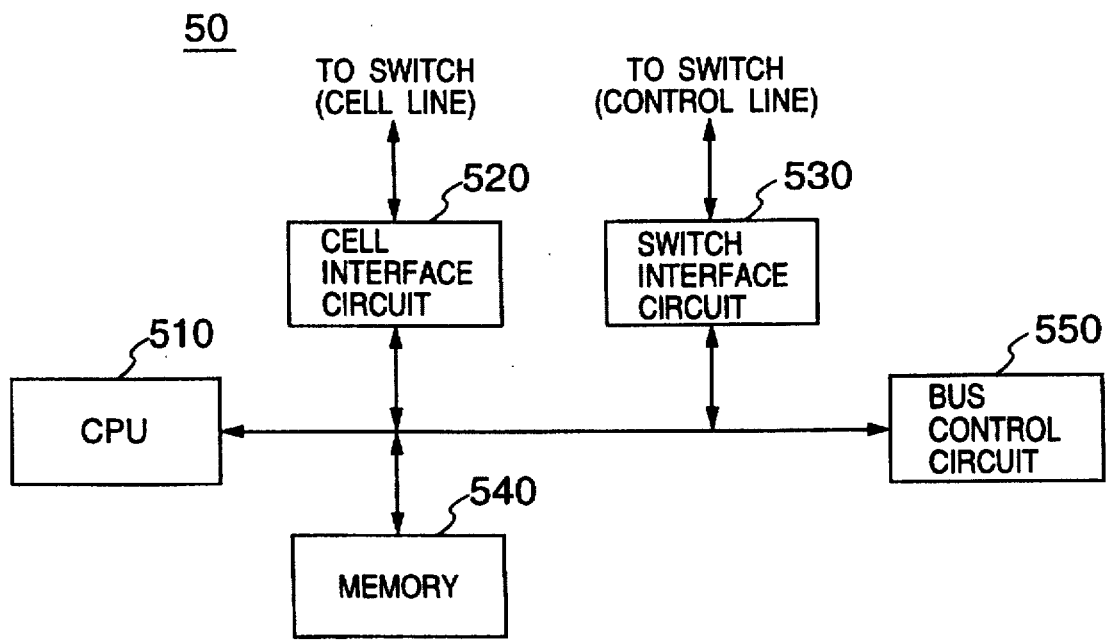
FIG. 10 is a block diagram showing the configuration of a processor (CP) circuit used in the ATM switch system according to the present invention.

FIG. 7 is a network configuration diagram showing a configuration example of a network using the ATM switch system according to the present invention. The network produces cells from packets received via a packet network 3 and statistically multiplexes the cells to output the resultant cells to an ATM network 5. In the configuration, an ATM switch system 1 which conducts an operation reverse to that of the network and which includes a packet multiplexer 10, a packet demultiplexer 30, and a control circuit (to be referred to as a CP circuit herebelow) supervising the multiplexer and demultiplexer 10 and 30 is connected to the packet network 3 and ATM network 5. Additionally, FIG. 8 is a block configuration diagram showing the structure of the packet multiplexer 10, FIG. 9 is a block configuration diagram showing the configuration of the packet demultiplexer 30, and FIG. 10 is a block configuration diagram showing the structure of the CP circuit 50.

Description will be first given of an outline of constitution and operation of the system. When an overflow test circuit 240 of the packet multiplexer 10 detects, according to the distribution of queue size, occurrence of an event in which the distribution of queue size is shifted to a distribution resulting in a cell loss probability exceeding the acceptable cell loss probability, the ATM switch system 1 of the embodiment initiates a packet read delay circuit 180 to delay transmission of cells to ATM at an downstream position and a burst division control circuit 200 to intermittently transmit cells therefrom, thereby controlling the average cell rate and burst size of cells to be sent to the ATM network 5. On the other hand, during the traffic regulation, when an underflow test circuit 260 detects, according to the distribution of queue size, occurrence of an event in which the distribution of queue size is shifted to a distribution resulting in a cell loss probability below the acceptable cell loss probability, the ATM switch system 1 stops operation of the packet read delay circuit 180 and the burst division control circuit 200. Through the sequence of operations, there is implemented the ATM switch system in which the ATM switch system adjust the average cell rate and burst size of the traffic to be fed to ATM switch systems in a downstream position to the processible burst size and average cell rate so as to achieve a control operation to recover the cell loss probability to the acceptable cell loss probability in the ATM switch system.

Next, description will be given of the principle of the present invention, i.e., a method of testing the cell loss probability according to the queue size distribution. Specifically, description will be given in detail of a statistical test method in which according to the queue size of cells inputted to the buffer, a statistical test is conducted for the values of probability C of occurrence of a burst-level queue and average burst size β, the probability C and average burst size β being obtained from observed values which can be observed in a short period time, for example, in a period of time at a level in which a queue size exceeds a predetermined queue size at 1/10*4-level probability. According to these values, a statistical test is conducted to decide whether or not the traffic characteristic (cell loss probability) of cells inputted to the ATM switch system 1 is beyond the values corresponding to the acceptable cell loss probability beforehand specified.

Probability density function f(x) of cell queue size x of the ATM switch system shown in FIG. 1 can be expanded into a form applicable to the traffic of multiple call types in a manner similar to that of the approximation theory of cell loss probability proposed by the present inventor in the article "A Cell Loss Approximation Method Applicable for ATM Traffic of which Burst Length are Depend on General Distributions", the Technical Report of the Institute of Electronics, Information and Communication Engineers, Exchange System Group, SSE94-242 (1995-03), namely, the function f(x) can be approximated as follows.

$$f(x) = f1(x) + f2(x) + f3(x) \quad (12)$$
$$= 3 \cdot C \cdot \beta \cdot \exp(-3 \cdot \beta \cdot x) +$$
$$3 \cdot C \cdot \beta \cdot \gamma \cdot \exp(-3 \cdot \beta \cdot x) +$$
$$C \cdot \beta \cdot \gamma \cdot \exp(-\beta \cdot x)$$

In the expression above, x indicates a queue size, C denotes a probability of occurrence of a burst-level queue, $1/\beta$ stands for a burst-level queue size and is the same as that used in expression (1), $\gamma$ designates a compensation coefficient to compensate deviation with respect to time in the value of cells (queue) accumulated in the buffer due to the discrepancy between the burst shape (the burst occurring instantaneously) in the approximation theory and the actual burst shape (the burst occurring in a period of time with a time width), and C and $\gamma$ are respectively expressed as follows.

$$C = Ps \cdot \rho/(1-\rho) \quad (13)$$

$$\gamma = (1 - V/(N \cdot v)) \cdot \exp(-\beta(V/v-1)) \quad (14)$$

In this regard, Ps of expression (13) denotes a probability of cells accumulated in the buffer due to cell collision when bursts existing in the exchange simultaneously arrive at the output line. Ps is represented as follows.

$$Ps = (a/(s!))/ \quad (15)$$
$$(\Sigma((a \cdot i)/(i!)) + ((a^*s)/(s!)) \cdot (\rho/(1-\rho)))$$

where, $\Sigma$ designates the total obtained for i ranging from 0 to s.

In addition, s and a of expression (15) respectively indicate the number of bursts and traffic flow which can be supported by the output line. Parameters s and a are expressed as follows.

$$s = V/v \quad (16)$$

$$a = (N \cdot <v>)/v \quad (17)$$

In the probability density function of expression (12), the first term f1(x) and second term f2(x) represent a probability of occurrence of a queue taking place due to the cell-level collision and the third term f3(x) indicates an occurrence probability of a queue by the burst-level collision.

Figure 4:
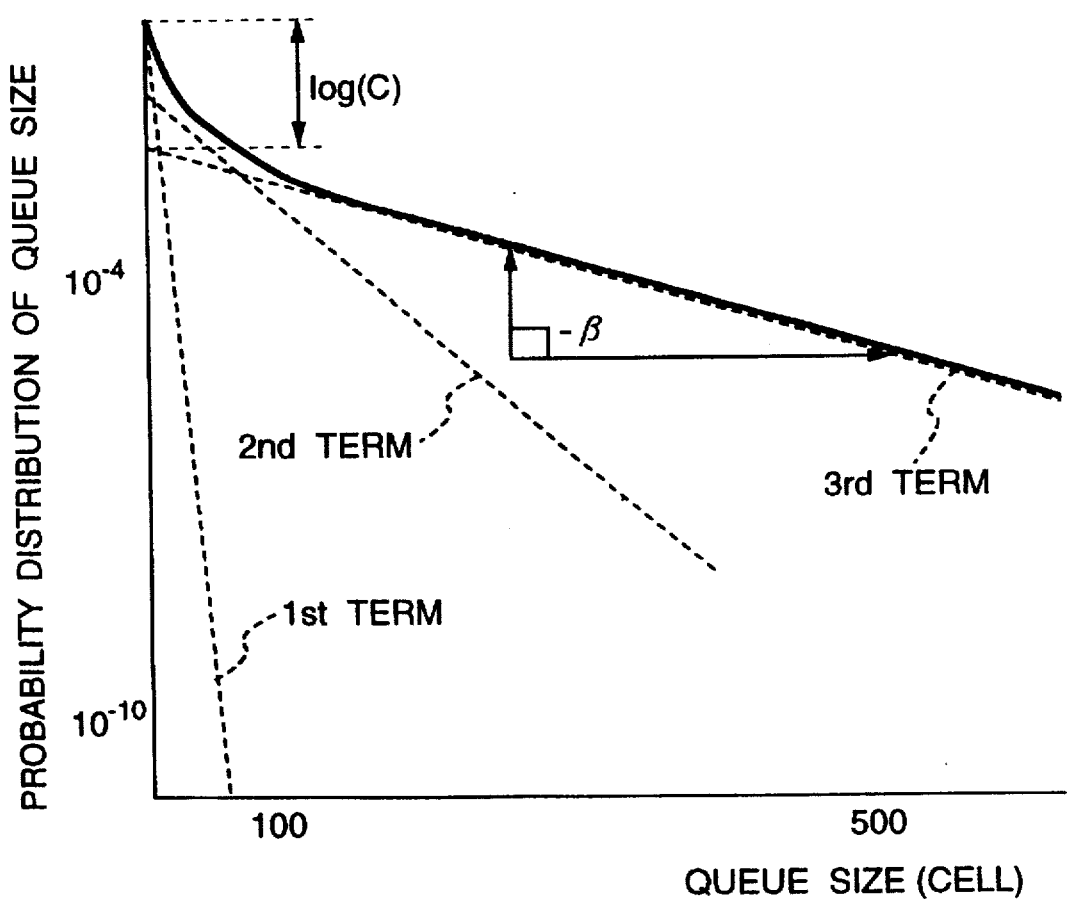
FIG. 4 is a graph showing curves of the probability density function of the queue size of cells in the buffer of the ATM switch system shown in FIG. 1.
Figure 6:
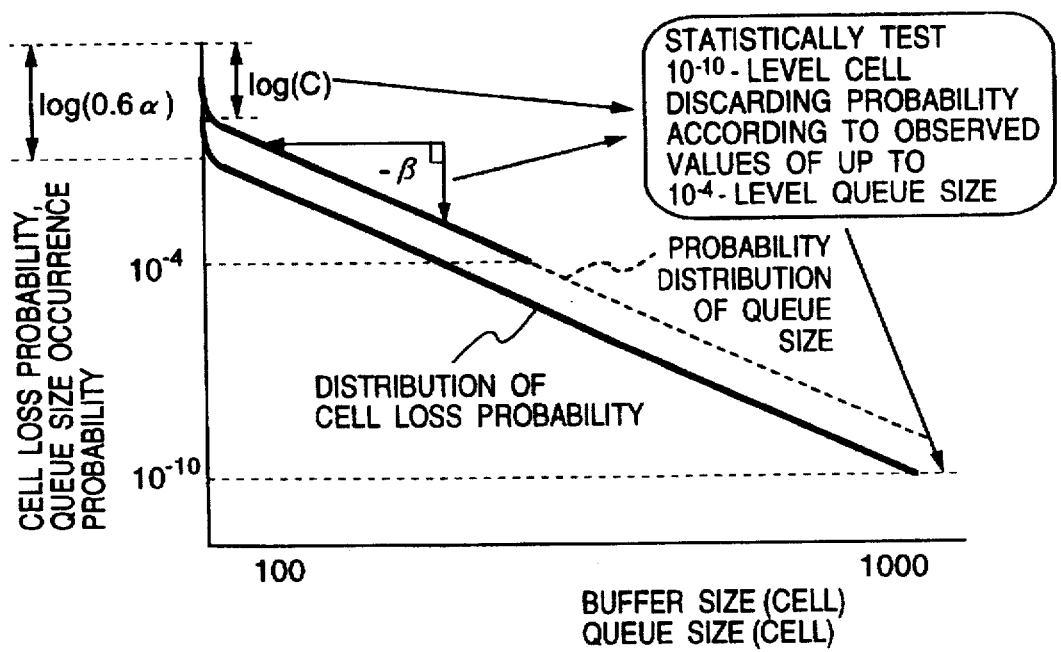
FIG. 6 is a graph of curves for explaining the relationship between the cell loss probability and the probability density function of cell queue.

FIG. 4 is a graph of curves showing the probability density function of queue size represented by expression (12). As can be seen therefrom, in a zone of a long queue size, the occurrence probability of queue depends on the third term, i.e., the occurrence probability f3(x) of queue caused by the burst-level collision. Moreover, like the curve of the cell loss probability Ploss4(x) of expression (1), the curve of FIG. 4 is represented by a curve with intercept Log C and gradient β, namely, parallel to the curve of the cell loss probability. Occurrence probability C of burst-level queue indicating the intercept is a probability of accumulation of cells in the buffer due to collision taking place when bursts existing in the exchange simultaneously arrives at the pertinent output line. Probability C corresponds to output line overflow probability α designating a ratio of cells inputted to the buffer due to burst collision.

In consequence, in the range of the buffer size and queue size in which the cell loss probability and the probability density function of queue are represented by straight lines parallel to each other and are associated with each other as described above, a short queue requiring a short period of time for the observation thereof is determined as an observation point such that the queue size is observed at the observation point to attain the values of occurrence probability C of burst-level queue and average burst size β to carry out a statistical test of the probability density function of queue. Consequently, without directly observing the cell loss probability of the ATM switch system for a long buffer size, the values of the cell loss probability can be obtained from the probability density function of cell queue. According to the obtained values, a statistical test can be effected to decide whether or not the traffic characteristic (cell loss probability) of cells inputted to the ATM switch system is beyond the values associated with the acceptable cell loss probability beforehand specified.

Specifically, to decide the observation point, it is only necessary to select a queue size for which $\beta \cdot \gamma \cdot \exp(-\beta \cdot x)$ is almost 1 (corresponding to a possibly small queue size in the range of queue size in which the cell loss probability and the probability density function of queue are drawn as straight lines parallel to each other and are associated with each other as described above) so as to set the queue size as the observation point x t of queue size. Once observation point x t of cell queue size is decided, it is possible only by observing the queue size to attain occurrence probability C of burst-level queue and average burst size β according to simple calculations as follows, thereby conducting the statistical test of the probability density function. Namely, it is possible to decide whether or not the traffic characteristic (cell loss probability) of cells inputted to the ATM switch system is beyond the values associated with the acceptable cell loss probability beforehand specified.

$$C = \text{(number of events in which queue size exceeds } x \text{ } t\text{)/(number of observations)} \quad (18)$$

$$1/\beta = \text{(sum of queue size of which queue size exceeds } x \text{ } t\text{)/(number of events in which queue size exceeds } x \text{ } t\text{)} \quad (19)$$

Thanks to the method and configuration above, an observation point of queue size is set in the buffer to obtain frequency in which the queue size exceeds the value at observation point (to be referred to as a threshold value herebelow) and the average queue size thereat so as to decide whether or not the value of the average queue size value is beyond the assumed values of the average queue size associated with the acceptable cell loss probability of the ATM switch system, thereby testing occurrence of an event in which the cell loss probability is over or under the acceptable cell loss probability.

Referring to the drawing, description will be further given in detail of the configuration and operation of the ATM switch system 1 provided with the traffic control function according to the present invention.

The ATM switch system 1 according to the present invention is employed with networks shown in FIG. 7 and includes a packet multiplexer 10, a packet demultiplexer 30, and CP circuit 50 in which packets are transformed into ATM cells through multiplex operations.

The packet multiplexer 10 includes, as shown in the block diagram of FIG. 8, packet network interface circuits 100, packet transmitter circuits 120, a timesharing multiplexer (MUX) 140, and a cell buffer 160. The configuration further includes a queue size counter 280, an overflow test circuit 240, an underflow test circuit 260, and a regulation flag memory 220 which are disposed to statistically test the cell loss probability using the queue size according to the present invention and a packet read delay circuit 180 and a division control circuit 200 which are employed to control the traffic.

In the construction, the packet network interface circuit 100 receives a packet from the packet network 3 to send the packet to the packet transmitter circuit 120. The transmitter 120 converts the packet into cells. On receiving cells from a plurality of packet transmitter circuits 120, the multiplexer (MUX) 140 multiplexes the cells. The cell buffer 160 accumulates therein cells undergone collision during the cell multiplexing operation to buffer the cell collision and thereafter sends the cells to the ATM network 5. The queue size counter 280 measures the number of cells (queue size) accumulated in the cell buffer 160. In this counter 280, the count value is incremented by one when a cell is inputted thereto and is decremented by one when a cell is outputted therefrom. The value of the counter 280 is supplied as a queue size to the overflow and underflow testing circuits 240 and 260 at a predetermined cycle. The circuit 240 obtains a distribution of queue size to decide whether or not there occurs an even in which the obtained distribution leads to a cell loss probability exceeding the acceptable cell loss probability. The circuit 260 attains a distribution of queue size to determine whether or not there occurs an even in which the obtained distribution leads to a cell loss probability below the acceptable cell loss probability.

When either one of the average cell rate and mean buffer size of input cells has a traffic characteristic in which the acceptable loss probability predetermined in the ATM switch system 1 is exceeded, the overflow test circuit 240 tests the occurrence of event to output a regulation start signal so as to set the regulation flag memory 220 to ON. In response to the output from the memory 220, the packet read delay circuit 180 and burst division control circuit 200 are activated to thereby control (regulate) the traffic. Concretely, the activated delay circuit 180 delays the operation to read packets from the packet network 3 to lower the average cell rate. Additionally, the initiated control circuit 200 causes the packet transmitter circuit 120 to intermittently send cells therefrom so as to reduce the burst size.

During the traffic regulation, when the values of the average cell rate and mean buffer size of input cells have traffic characteristics related to a loss probability less than the acceptable loss probability predetermined in the ATM switch system 1, the underflow test circuit 260 tests the occurrence of event to output a regulation release signal so as to set the regulation flag memory 220 to OFF. In response to the output from the memory 220, the operations of the packet read delay circuit 180 and burst division control circuit 200 are stopped to thereby control (release the regulation of) the traffic.

The packet demultiplexer 30 includes, as shown in the block configuration diagram of FIG. 9, packet interface circuits 100, a timesharing demultiplexer (DMUX) 300, and packet receiver circuits 340. In the construction, the demultiplexer 300 receives multiplexed cells from the ATM network 5 to distribute the cells to a plurality of packet receiver circuits 340. The circuit 340 transforms the cells into a packet to send the packet to the packet network interface circuit 100. The circuit 100 transmits the received packet to the packet network 3.

FIG. 10 is a block configuration diagram showing the configuration of the CP circuit 50 adopted in the ATM switch system of the present invention. The circuit 50 includes a central processing unit (CPU) 510, a software memory 540, a cell interface circuit 530, a switch interface circuit 530, and a bus control circuit 500 to connect these constituent components to each other and to control operations thereof. The CP circuit 50 supervises the packet multiplexer and demultiplexer 10 and 30 to resultantly control the overall operation of the ATM switch system 1.

Next, referring to the drawings, description will be further given of the constitution and operation of the overflow testing circuit 240, underflow testing circuit 260, packet read delay circuit 180, burst division control circuit 200, packet transmitter circuit 120, and packet receiver circuit 340, which implement the traffic control function according to the present invention.

Figure 11:
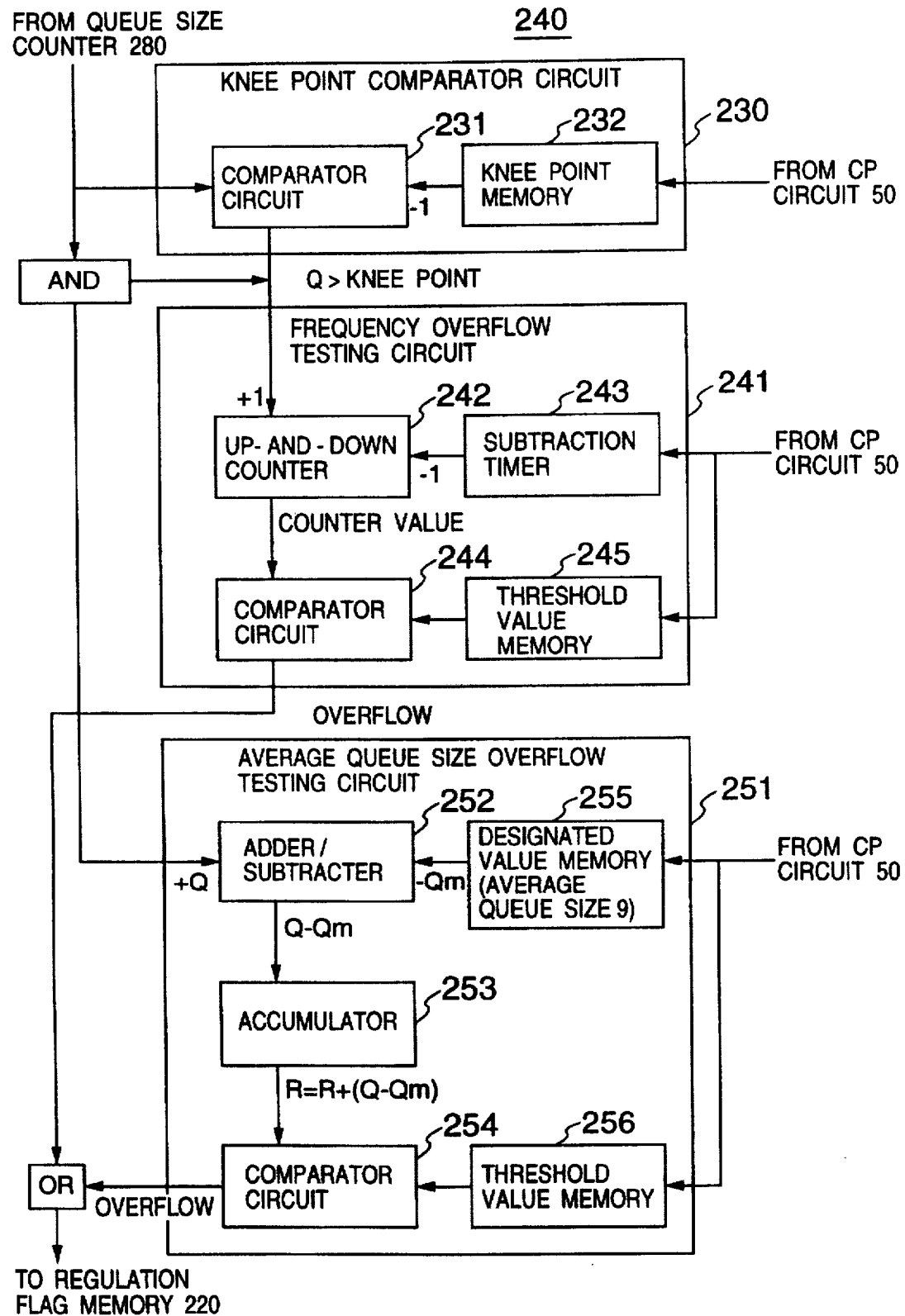
FIG. 11 is a block diagram showing the configuration of an overflow test circuit adopted in the ATM switch system according to the present invention.

FIG. 11 is a block construction diagram showing the structure of the overflow testing circuit 140 achieving the traffic control function according to the present invention. The circuit 240 attains a distribution of queue size to decide in the above method according to the distribution whether or not there occurs an event in which the traffic characteristic of input cells leads to a cell loss probability exceeding the acceptable cell loss probability. The circuit 240 includes a knee point comparator circuit 230 to decided whether or not the queue size exceeds the queue size determined according to the observation point xt, a frequency overflow testing circuit 24 to obtain an occurrence frequency of the queue exceeding xt so as to decide whether or not the frequency exceeds the acceptable frequency, and an average queue size overflow testing circuit 251 to obtain an average queue size so as to determine whether or not the average queue size exceeds the acceptable value.

In more detail, the knee point comparator circuit 230 includes a comparator circuit 231 and a knee point memory 232 such that the observation point (queue size) xt is decided at setup of the ATM switch system 1 and is stored in the memory 232. When an observed value of queue size is supplied from the queue size counter 280 to the knee point comparator circuit 230, the comparator circuit 231 compares the observed value with the value in the memory 232 to output, when the queue size is larger than xt, an ON signal therefrom to notify the event.

The frequency overflow testing circuit 241 includes an up-and-down counter 242, a subtraction timer 243, and a comparator circuit 244 and a threshold value memory 245 which test the frequency overflow. The circuit 241 attains the probability (frequency of event in which the queue size exceeds xt) represented by expression (18) and then decides whether or not the obtained value exceeds the acceptable value stored in the threshold memory 245, i.e., whether or not the overflow takes place. Specifically, the decision is conducted as follows.

(number of occurrences of queue exceeding xt: output from counter 242)−(acceptable number of occurrences: output from memory 245)>0    (20)

Each time there occurs a queue size exceeding xt, the counter 242 is incremented by one in response to the ON signal outputted from the knee point comparator circuit 230; whereas, the counter 242 is decremented by one in response to an output from the subtraction time 243 notifying a predetermined cycle to thereby attain the number of occurrences such that the obtained number of occurrences is compared with the value of memory 245 by the comparator circuit 244 to decide whether or not the pertinent value exceeds zero. However, in a practical operation, since the observed values of queue size is associated with a statistic fluctuation, there is employed a positive value including a margin (to be referred to as an acceptable frequency accumulation value) for the decision. If the frequency exceeds the acceptable value as a result of the decision, the frequency overflow testing circuit 241 assumes a frequency overflow and outputs an ON signal.

As above, when there occurs a queue size exceeding xt, the frequency overflow testing circuit 241 of the present invention increments the value of the counter 242 and decrements the value at a fixed cycle. Consequently, even when there appears fluctuation in the queue size, if the frequency of occurrence of the queue size exceeding xt is less than that of subtraction due to the timer 243, the accumulated value of fluctuation is cancelled. On the other hand, if the frequency of occurrence exceeds that of subtraction, the accumulated value of fluctuation exceeds the value in the memory 245. That is, when the value of the counter 242 exceeds the value in the memory 245, it is assumed that the frequency of occurrence of the queue exceeding xt is more than the acceptable occurrence frequency determined in the ATM switch system 1, leading to decision of occurrence of an event in which the traffic characteristic of input cells leads to a cell loss probability exceeding the acceptable cell loss probability.

In this regard, according to the configuration, for the acceptable occurrence frequency of the queue exceeding xt in consideration of the cycle of the subtraction timer and the accumulated value of acceptable occurrence frequency, a value is determined at setup of the ATM switch system 1 like in the knee point comparator circuit 230 such that the CP circuit 50 stores the value in the timer 243 and memory 245.

The average queue size overflow testing circuit 251 includes an adder 252, an accumulation counter (accumulator) 253, and a comparator circuit 254, a designated value memory 255, and a register threshold value memory 256 which tests the average queue size overflow. The circuit 251 obtains the average queue size (average value of the queues of which the queue size exceeds xt) represented by expression (19) and determines whether or not the attained value exceeds the acceptable value stored in the memory 256, i.e., whether or not the overflow takes place. Specifically, the decision is made as follows.

$\Sigma$((observed value of queue size: output from counter 280)−(acceptable average queue size: output from memory 255)−(acceptable value: output from memory 256)>0    (21)

The adder 252 subtracts the acceptable average queue size stored in the designated value memory 255 from the value of queue size inputted thereto when ON signal is outputted from the knee point comparator circuit 230 such that the accumulated value of the result of subtraction is obtained in the accumulator 253. The comparator 254 decides whether or not the accumulated value is more than the acceptable value stored in the threshold value memory 256. However, like the frequency overflow testing circuit 241, the circuit 254 decides the condition using the value including a margin (acceptable queue size accumulation value) and then assumes the queue size average value overflow to output an ON signal when the average value is more than the acceptable value.

As described above, when there appears a queue size exceeding xt, the average queue size overflow testing circuit 251 of the present invention subtracts the value predetermined for the acceptable average queue size (corresponding to observation point xt) from the value of the queue size to accumulate the result of subtraction. Therefore, even when the queue size fluctuates, if the average of the queue size values exceeding xt is less than the acceptable average size, the accumulated value of fluctuation is cancelled. On the other hand, the average value of queues which occurred is more than the acceptable average value, the accumulated value of fluctuation exceeds the value in the memory 256. In other words, when the value of the accumulator 253 is more than the value in the memory 254, it is assumed that the average of queue size values exceeding xt is more than the acceptable average queue size determined in the ATM switch system 1, thereby deciding occurrence of an event in which the acceptable cell loss probability is exceeded due to the traffic characteristic of input cells.

In this connection, according to the configuration, for the average acceptable value of queue exceeding xt in consideration of the acceptable average queue size (observation point xt) and acceptable queue size accumulation value of the designated value memory 255, a value is determined at setup of the ATM switch system 1 like in the knee point comparator circuit 230 and then the CP circuit 50 stores the value in the respective memories.

When either one of the frequency overflow testing circuit 241 and average queue size overflow testing circuit 251 is ON, the overflow testing circuit 240 assumes occurrence of an event related to a fear that the acceptable cell loss probability is exceeded in the exchange 1 and hence outputs a regulation start signal to the regulation flag memory 220.

Figure 12:
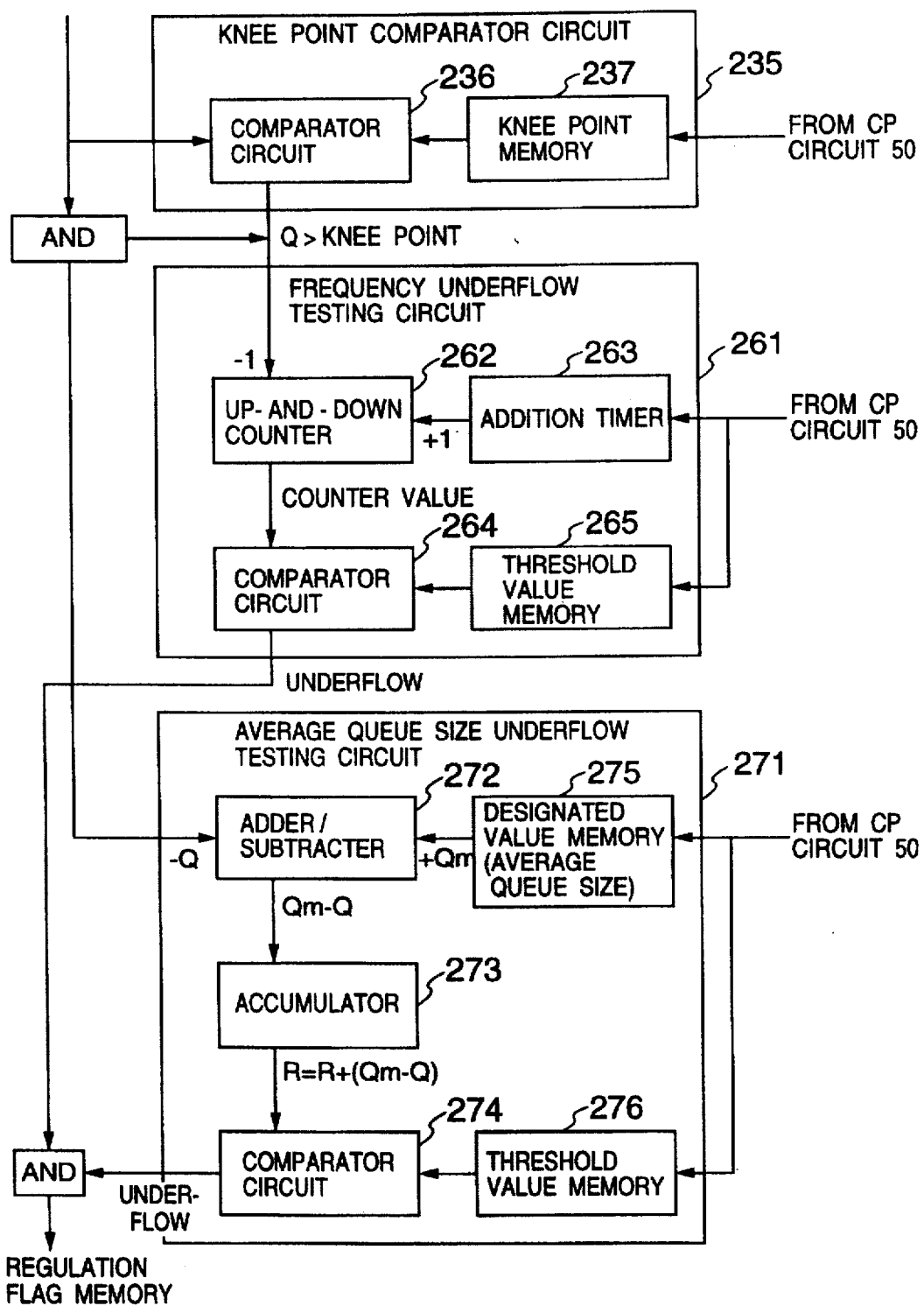
FIG. 12 is a block diagram showing the configuration of an underflow test circuit employed in the ATM switch system according to the present invention.

FIG. 12 is a block configuration diagram showing the structure of the underflow testing circuit 260 implementing the traffic control function according to the present invention. In contrast with the overflow testing circuit 240, the underflow testing circuit 260 obtains a distribution of queue size during the traffic regulation and decides according to the distribution the occurrence of an event in which the traffic characteristic of input cells leads to a distribution associated with a cell loss probability less than the acceptable cell loss probability, namely, whether or not the state in which the acceptable cell loss probability is recovered to a state in which the cell loss is within the normal acceptable cell loss. The underflow testing circuit 260 includes a knee point comparator circuit 235 to decide whether or not the queue size is more than the queue size determined for the observation point xt, a frequency underflow testing circuit 261 to obtain the occurrence frequency of queue exceeding xt so as to decide whether or not the frequency is less than the acceptable frequency, and an average queue size underflow testing circuit 271 to attain an average size of queues exceeding xt so as to decide whether or not the average queue size is less than the acceptable value.

The detailed configuration and operation of the circuit 260 are similar to or opposite to those of the overflow testing circuit 240. The knee point comparator circuit 235 includes a comparator circuit 236 and a knee point memory 237. The circuit 235 is the same as the knee point comparator circuit 231 of the overflow testing circuit 240 in the configuration and operation.

The frequency underflow testing circuit 261 includes an up-and-down counter 262, an addition timer 263, and a comparator 264 and a threshold value memory 265 which test the frequency underflow. The circuit 261 attains a probability (frequency of queue size exceeding xt) and decides, in contrast with the frequency overflow testing circuit 241, whether or not the obtained value is less than the acceptable value stored in the memory 245, i.e., whether or not the underflow takes place. Specifically, the decision is accomplished as follows.

$$\text{(acceptable number of occurrences: output from memory 265)} - \text{(number of occurrences of queue exceeding } xt\text{: output from counter 262)} > 0 \quad (22)$$

Each time there occurs a queue size exceeding xt, the up-and-down counter 262 is incremented by one in response to the ON signal outputted from the knee point comparator circuit 235. The counter 262 is decrements by one in response to an output from the timer 263 notifying a predetermined cycle. The resultant number of occurrences is compared with the value in the memory 265 by the comparator 264 to decide whether or not the pertinent value exceeds zero. However, in a practical operation, the decision is conducted by setting an acceptable frequency accumulation value like in the frequency overflow testing circuit 241. When the frequency exceeds the acceptable value as a result of decision, the circuit 261 assumes the frequency underflow and then outputs an ON signal therefrom.

As described above, when there occurs a queue size exceeding xt, the frequency underflow testing circuit 261 of the present invention increments the counter 262 and decrements the counter 262 at a fixed cycle. Consequently, even when the queue size fluctuates, if the frequency of occurrence of the queue size more than xt exceeds that of addition due to the timer 263, the accumulated value of fluctuation is cancelled. On the other hand, when the frequency of occurrence is less than that of addition, the accumulated value of fluctuation is more than the value in the memory 265. That is, when the value of the counter 262 is more than that in the memory 265, the frequency of occurrence of the queue exceeding xt is assumed to be less than the acceptable frequency of occurrence determined in the ATM switch system 1, thereby deciding occurrence of an event in which the traffic characteristic of input cells leads to a cell loss probability less than the acceptable cell loss probability (recovery).

In this connection, according to the configuration, for the acceptable occurrence frequency of queue exceeding xt in consideration of the cycle of the addition timer 263 and the acceptable frequency accumulation value, the value is determined at setup of the ATM switch system like in the embodiment described above such that the CP circuit 50 sets the value to the associated location.

The average queue size underflow testing circuit 271 includes an adder 272 and an accumulator 273 and a comparator circuit 274, a designated value memory 275, and a threshold value memory 276 which test the average queue size underflow. The circuit 271 obtains the average queue size (average value of queues of which the queue size exceeds xt) represented by expression (19) and then decides whether or not the value is less than the acceptable value stored in the memory 256, namely, whether or not the underflow takes place. Concretely, the decision is made as follows.

$$\Sigma((\text{acceptable average queue size: output from memory 275}) - (\text{observed value of queue size: output from counter 280})) - (\text{acceptable value: output from memory 276}) > 0 \quad (23)$$

When the knee point comparator circuit 234 outputs an ON signal, the input value of queue size is subtracted from the acceptable average queue size stored in the memory 275 by the adder 252 such that the accumulated value of the result of subtraction is attained by the accumulator 273. The comparator 274 decides whether or not the accumulated value is more than the acceptable value stored in the memory 276. However, like in other testing circuits, there is employed the acceptable queue size accumulation value for the decision. When the average value is less than the acceptable value, the circuit 271 assumes the queue size average value underflow to output an ON signal therefrom.

As above, when there appears a queue size exceeding xt, the underflow testing circuit 271 of the present invention subtracts the value of queue size from that of the acceptable average queue size (corresponding to observation point xt) beforehand determined to accumulate the result of subtraction. Therefore, even when the queue size fluctuates, if the average of queue size exceeding xt is more than the acceptable average size, the accumulated value of fluctuation is cancelled. On the other hand, when the average value of queues occurred is less than the acceptable average value, the accumulated value of fluctuation is more than the value in the memory 256. That is, when the value of the accumulator 273 is more than that in the memory 254, the average size of queues exceeding xt is assumed to be less than the acceptable average queue size determined in the ATM switch system, thereby deciding occurrence of an event in which the traffic characteristic of input cells causes a cell loss probability to be in the range of acceptable cell loss probability.

In this connection, according to the configuration, for the acceptable average value of queues exceeding xt in consideration of the acceptable average queue size (observation point xt) and acceptable queue size accumulation value stored in the respective memories, the CP circuit 50 sets the value to the associated location as in the embodiments above.

The underflow testing circuit 260 assumes, when both of the frequency underflow testing circuit 261 and average queue size underflow testing circuit 271 output ON signals, that there is recovered an event on the safety side in which the cell loss probability is less than the acceptable cell loss probability in the exchange 1 and hence a regulation release signal is outputted to the regulation flag memory 220.

Figure 13:
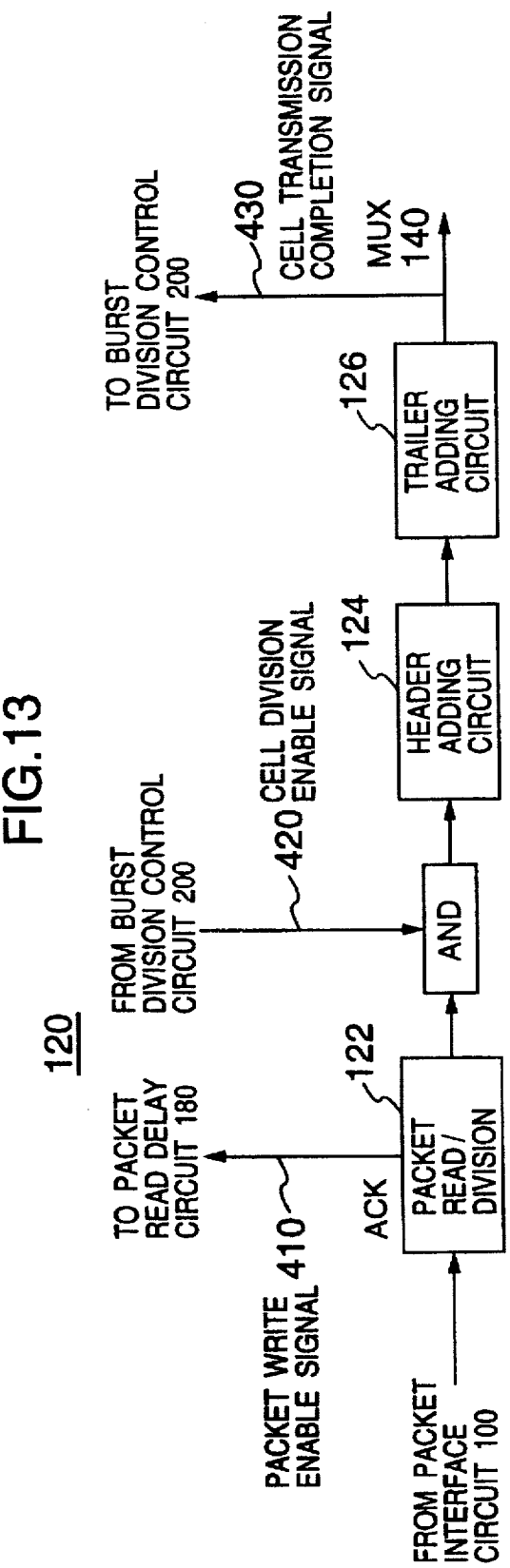
FIG. 13 is a block diagram showing the configuration of a packet transmitter circuit (from the packet network to the ATM network) utilized in the ATM switch system according to the present invention.

FIG. 13 is a block configuration diagram showing the construction of the packet transmitter circuit 120 achieving the traffic control function according to the present invention. The circuit 120 includes a packet dividing or separating section 122 to divide or to separate the packet into groups each including a fixed amount of data and a cell converter section including a cell header adder section 124 and a trailer adder circuit 126. To implement the traffic control function of the present invention, the circuit 120 is configured such that (1) a packet write enable signal 410 is sent from the packet dividing section 122 to the packet read delay control circuit 180, (2) a cell transmission completion signal 430 is outputted from the trailer adder circuit 126 as the exit of the packet transmission circuit to the burst length control circuit 200, and (3) a next cell division enable signal 420 is supplied from the burst length control signal 200 to the output from the packet dividing section 122.

Figure 14:
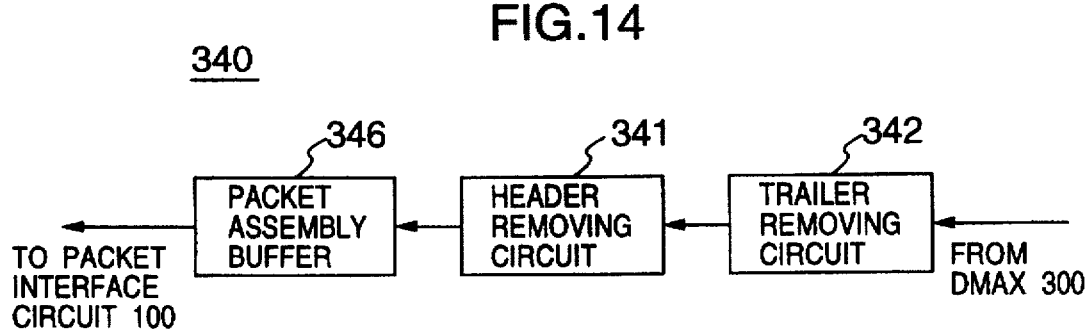
FIG. 14 is a block diagram showing the configuration of a packet receiver circuit (from the ATM network to the packet network) adopted in the ATM switch system according to the present invention.

FIG. 14 is a block configuration diagram showing the constitution of the packet receiver circuit 340. The circuit 340 operates in a manner reverse to that of the packet transmitter circuit 120 and includes a cell conversion section including a cell header removing section 341 and a trailer removing section 342 and a packet assembly buffer 346 to recover cells into a packet. In this connection, the cells inputted to the receiver circuit have already been undergone a traffic control operation and hence any special operation is unnecessary. Consequently, the connection to implement the traffic control function described in conjunction with the packet transmitter circuit 120 is not required, namely, it is only necessary to use an ordinary packet receiver circuit.

Figure 15:
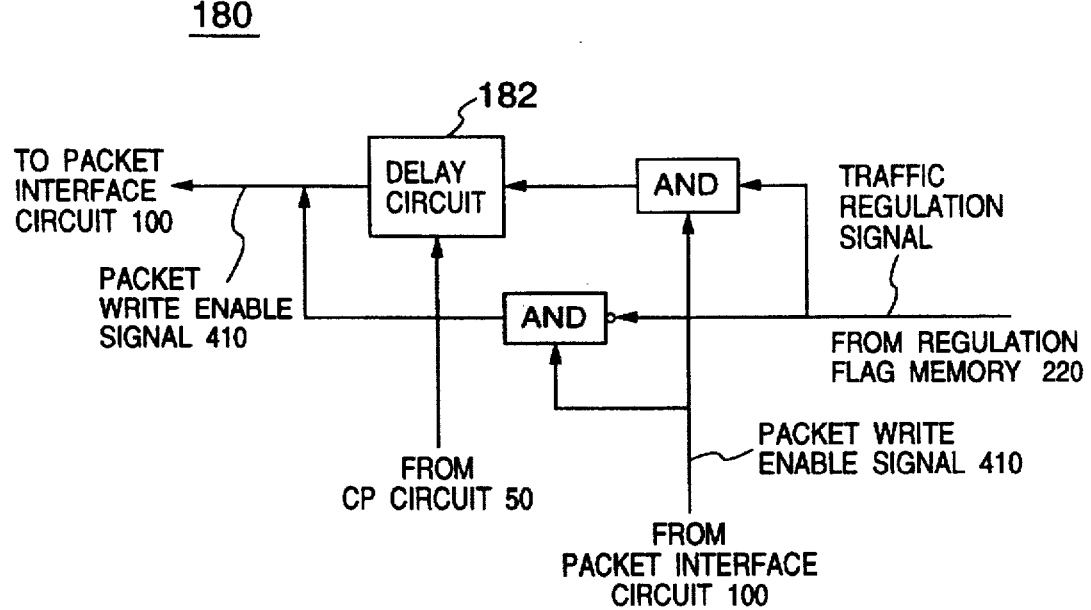
FIG. 15 is a block diagram showing the configuration of a packet read delay circuit to control the average cell rate in a traffic control circuit used in the ATM switch system according to the present invention.

FIG. 15 is a block configuration circuit showing the constitution of the packet read delay circuit 180 to achieve the traffic control function according to the present invention. The circuit 180 includes a function operative, when the overflow testing circuit 240 of the ATM switch system 1 detects occurrence of an event in which input cells leads to a cell loss probability exceeding the acceptable cell loss probability, to delay the operation to read packets from the packet network 3 so as to lower the average cell rate. The circuit 180 includes a delay circuit 182 and AND gates.

Description will be next specifically given of operation of the delay circuit 180. First, on receiving a transmission demand from the packet network 3 when the packet write enable signal from the packet transmitter circuit 120 is OFF, the packet interface circuit 100 sends a busy packet to the network 3; whereas, on receiving a transmission demand from the packet network 3 when the packet write enable signal is ON, the packet interface circuit 100 sends a transmission grant packet to the network 3 to receive a packet to be communicated via the network so as to send the received packet to the packet transmitter circuit. In this situation, the ATM switch system 1 having the traffic control function of the present invention is configured such that the packet write enable signal from the transmitter circuit 120 is sent via the read delay circuit 180 to the interface circuit 100. In this configuration, when the traffic regulation signal is OFF, the packet write enable signal 410 is inputted to the interface circuit 100 without using the delay circuit 182. Therefore, on receiving a transmission demand from the network 3, the transmission grant packet can be immediately sent to the network 3. On the other hand, when the traffic regulation signal is set to ON, the state is changed such that the packet write enable signal 410 is fed via the delay circuit 182 to the interface circuit 100. Resultantly, even when the packet write enable signal is altered from OFF to ON, since the period of time of transmission of the busy packet additionally continues for the delay period of time associated with the packet write enable signal, the packet arrival time of the packet from the network 3 is delayed for the additional continuous period of transmission of the busy packet, namely, the average cell rate of cells can be reduced.

Figure 16:
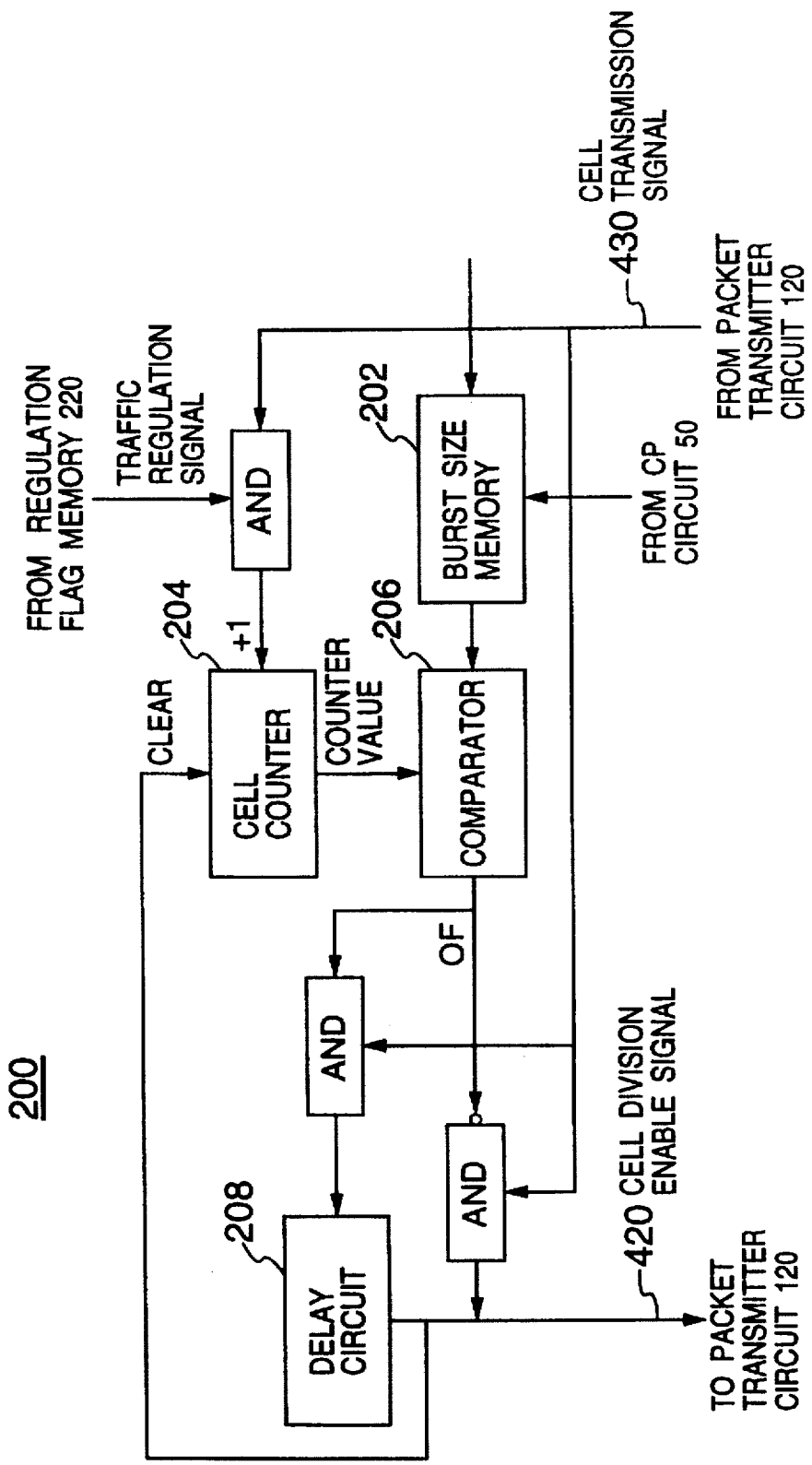
FIG. 16 is a block diagram showing the configuration of a burst interval division control circuit to control the burst interval in the traffic control circuit used in the ATM switch system according to the present invention.

FIG. 16 is a block configuration diagram showing the structure of the burst division control circuit 200 to implement the traffic control function according to the present invention. The circuit 200 has a function operative, when the overflow testing circuit 240 of the ATM switch system 1 decides occurrence of an event in which input cells lead to a cell loss probability exceeding the acceptable cell loss probability, to intermittently send cells from the packet transmitter circuit 120 to the ATM network to reduce the burst length of cells. The circuit 200 includes a delay circuit 208, a cell counter 204, a burst size comparator circuit 206, a burst size regulation value memory 202, and AND gates.

Next, operation of the packet read delay circuit 180 will be specifically described. First, the transmitter circuit 120 acquires packet data having a fixed data amount from the packet dividing section 122, adds a header and a trailer thereto, and then sends cells from the cell conversion section. When the transmission is completed, the cell conversion section generates a cell transmission completion signal 430. On recognizing the generation of the signal 430, the circuit 180 executes the division for the next data and the cell conversion. For this purpose, the ATM switch system including the traffic control function of the present invention is so configured to send the signal 430 from circuit 120 via the burst division control circuit 200 to the packet interface circuit 100. According to the configuration, when the traffic regulation signal is OFF, the signal 430 from the circuit 120 is directly passed as a enable signal for the next cell division to the packet transmitter circuit 120. On the other hand, when the traffic regulation signal is ON, each time the signal 430 is received from the circuit 120, the cell counter 204 is incremented by one. When the value of the counter 204 is updated, the value is inputted to the burst size comparator circuit 206. The circuit 206 compares the value of the counter 204 with that in the burst size regulation value memory 202. When the value of counter 204 is more than that in the memory 202 in the operation, the circuit 206 changes the burst regulation signal from OFF to ON. Until the value of counter 204 becomes more than that in the memory 202 in the operation, the circuit 206 keeps the burst regulation signal in the off state. When the burst regulation signal is ON as a result of the operation, the state is changed such that the cell transmission complete signal 430 from the packet transmitter circuit 120 is passed through the delay circuit 208 to clear the value of counter 204 to zero and is then sent as a division enable signal 420 for the next cell to the transmitter circuit 120. Therefore, even when the cell transmission completion signal is varied from OFF to ON, the transmission of cells from the transmitter circuit 120 is interrupted for the period of the cell transmission completion signal and hence the burst of cells sent to the ATM network 5 can be reduced.

As described above, according to the ATM switch system including the traffic control function of the present invention and the network using the same, in a case in which communications are conducted with the ATM network using the packet network and ATM cell multiplexing operation, there is provided a network in which even when any fluctuation appears in the characteristic of burst traffic from the packet network, there is not required any negotiation of the traffic characteristic during the communication between the ATM switch system and the packet network such that the characteristic of input burst traffic is adaptively changed so that the ATM switch system sets the cell loss probability within the acceptable range. In other words, since the packet network need not report the traffic characteristic to the ATM switch system, the statistic multiplexing operation of the packet network in which the connectionless communication is dominant can be easily implemented by the network employing the ATM switch system and the network utilizing the same.

In addition, since the ATM switch system carries out the traffic control, even when there is employed a packet network not having the traffic control function, it is possible to conduct the traffic control for the overall network and hence there can be constructed an economical network.

Furthermore, in the network above, since the negotiation of traffic is unnecessary between the packet network and the ATM network, it is not required to conduct any modification by the software systems controlling the respective networks for the network matching, which leads to construction of an economical network.

Additionally, since the packet network need not notify the traffic characteristic to the ATM switch system, the function to report the traffic characteristic to the ATM switch system is unnecessary, thereby advantageously removing the network overhead for the negotiation.

Referring next to the drawings, description will be given another embodiment of the ATM switch system having the traffic control function according to the present invention and a network using the same. The network of the embodiment includes an ATM switch system which statistically multiplexes traffic sensitive to delay and which is provided with the traffic control function according to the present invention.

In contrast with the preceding embodiments in which the cell loss probability is decided according to the distribution of cell queues to achieve the traffic control, the present embodiment achieves the traffic control such that when the traffic characteristic testing circuit decides an event (overflow) according to the distribution of queue size in which the cell delay distribution is shifted to a distribution leading to a delay exceeding an acceptable delay, a connection demand for another call is rejected. Thereafter, during the traffic regulation, when the testing circuit decides an occurrence of an event (underflow) according to the distribution of queue size in which the cell delay distribution is shifted to a distribution leading to a delay less than the acceptable delay, a call connection demand is re-started. Thanks to the the sequence of operations, there is implemented an ATM switch system in which the average cell rate an burst size of the traffic inputted to a downstream ATM are lowered to a burst size and an average cell rate which can be processed by the ATM switch system so as to recover the delay in the exchange to the acceptable delay.

Figure 17:
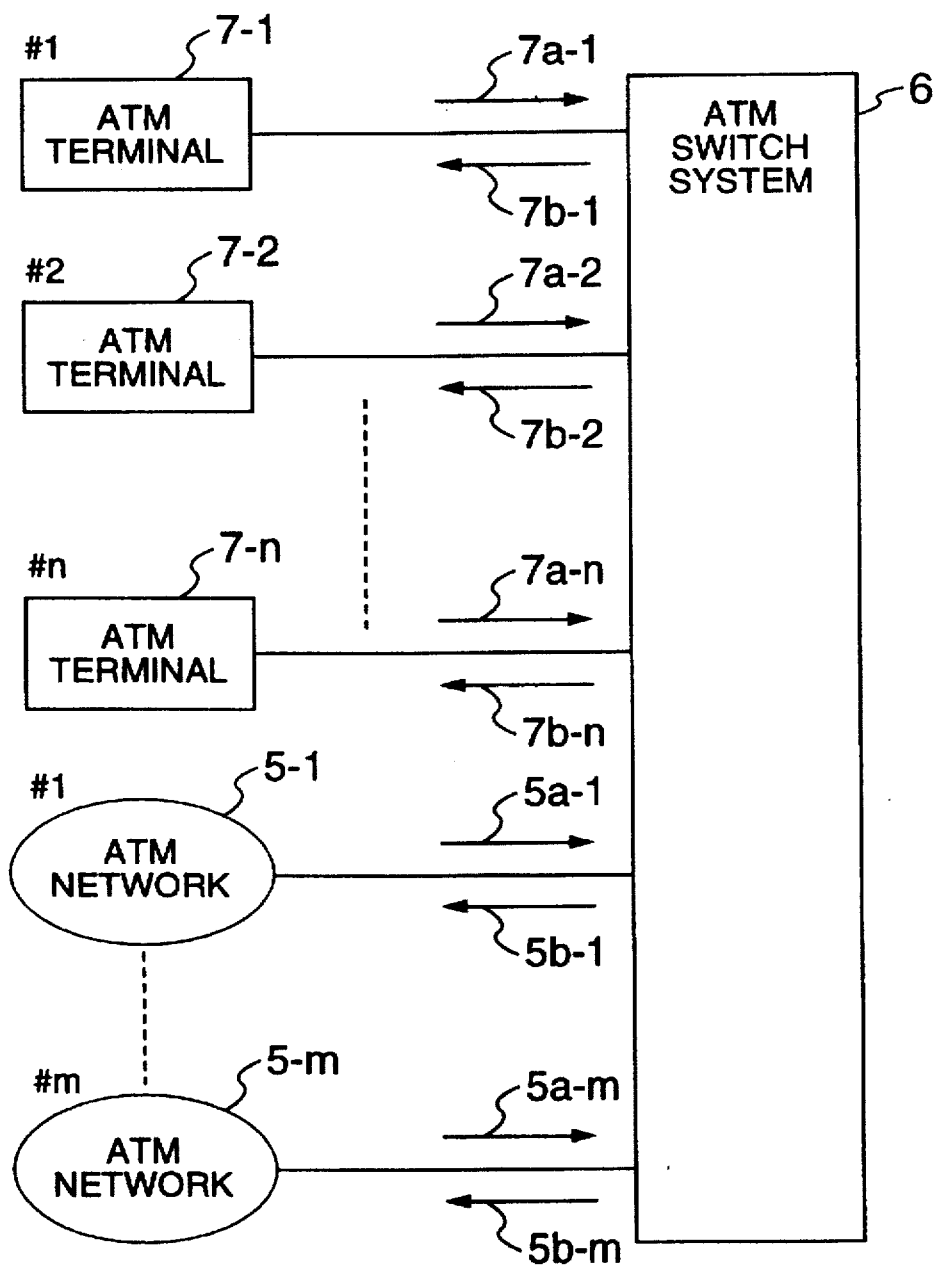
FIG. 17 is a network configuration diagram showing another configuration example of the network utilizing the ATM switch system according to the present invention.
Figure 18:
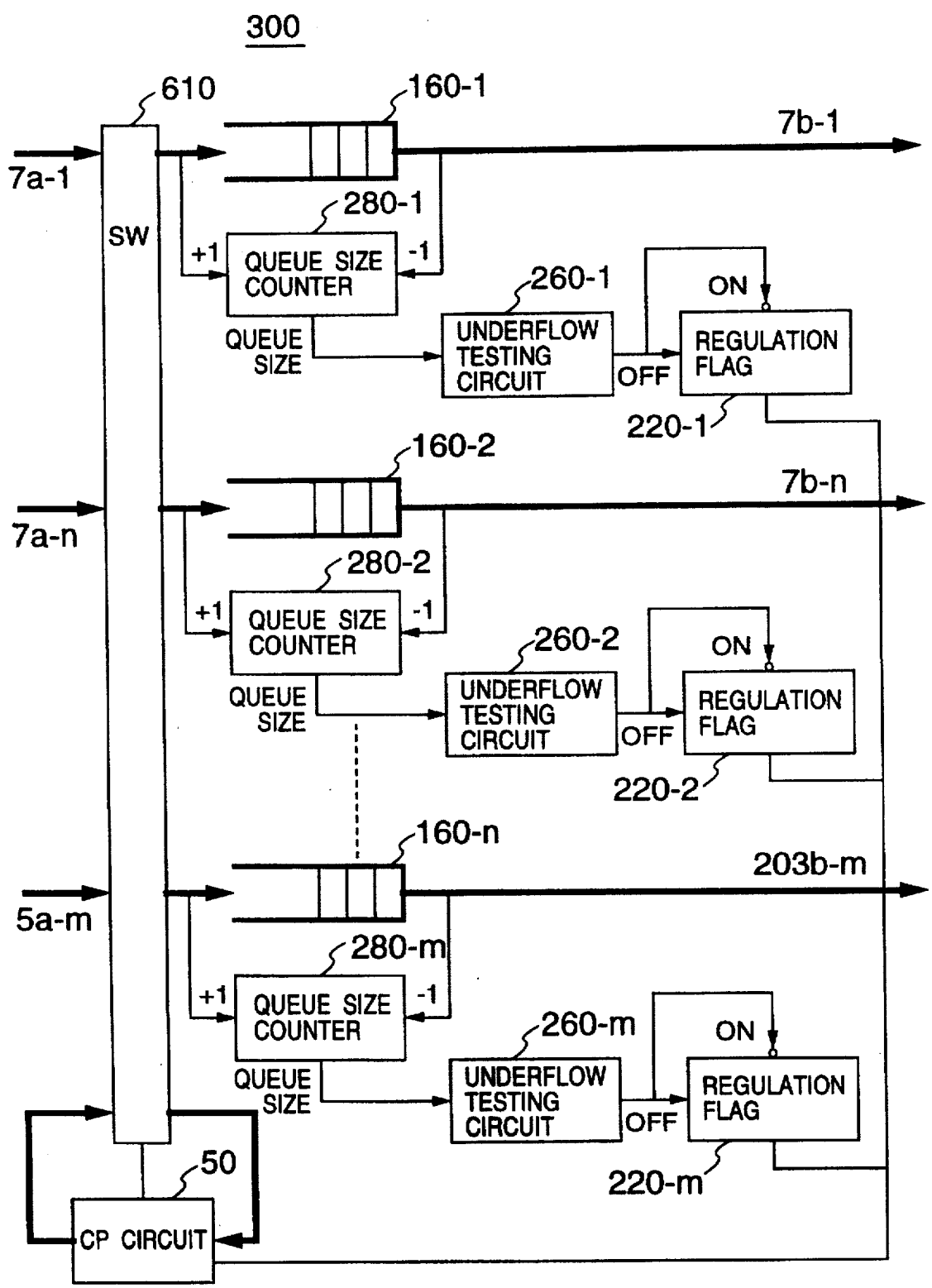
FIG. 18 is a block configuration diagram showing the construction of an ATM switch system applied to another network according to the present invention.

FIG. 17 is a network configuration diagram showing the structure of the network employing an ATM switch system 6 of another construction according to the present invention. In the network, the ATM switch system 6 is connected to ATM terminal facilities 7 and other ATM networks 7 to exchange ATM cells between the terminals, between the networks 5, and/or between terminals 7 and networks 5. Additionally, FIG. 18 is a block construction diagram showing the configuration of the ATM switch system differently configured according to the present invention in which reference numerals, and FIGS. 19A to 19E are message layout diagrams showing the layouts of communication messages (control messages) which are transformed into ATM cells and communicated via the network.

First, an outline of the configuration and operation of the configuration will be described. The ATM switch system 6 includes a switch circuit 610 to conduct a cell exchange operation between ATM input lines 5a and 7a and ATM output lines 5b and 7b and buffers 160 and a CP circuit 50 to buffer cell collisions due to the exchange process. In the exchange process to distributes ATM cells to the cell buffers 160 arranged for the respective output lines according to the VCI of each ATM cell, when there is decided according to the distribution of queue size an event (overflow) in which the cell delay distribution is shifted to a distribution leading to a delay exceeding the acceptable delay, the CP circuit 50 rejects a connection demand for another call, thereby regulating the traffic. When there is decided according to the distribution of queue size during the traffic regulation an event (underflow) in which the cell delay distribution is shifted to a distribution leading to a delay below the acceptable delay, the CP circuit 50 restarts a call connection demand. The CP circuit 50 specifically executes an arithmetic operation of the cell loss probability and a delay evaluation process such that when the cell loss probability or delay is equal to or less than the acceptable cell loss probability or delay from the terminal, the CP circuit 50 enables a terminal issuing a connection demand to establish connection. Alternatively, in place of the arithmetic operation of the cell loss probability and the delay evaluation process, the CP circuit 50 observes the distribution of queue size in the cell buffer 160 such that only when there is observed a distribution of queue size leading to a delay on the safety side, a call from the ATM terminal 7 is accepted, thereby implementing the ATM switch system. For this purpose, although the detailed description will be given later, the ATM switch system 6 of the embodiment includes a regulation flag memory 220, an underflow testing circuit 260, and a queue size counter 280 to observe the cell queue size in the cell buffer 160.

In the following paragraphs, description will be first given of a fundamental of the embodiment, namely, a method of testing the distribution of cell delay according to the distribution of queue size. Specifically, description will be given in detail of a method in which according to queue size of cells inputted to the buffer, a statistic test is conducted for the values of probability C of occurrence of the burst-level queue and average burst delay t attained from observed values obtained in a short period of time, for example, in a period of a level in which a queue size exceeds a predetermined queue size with a 1/10*4-level probability such that according to these values, whether or not the traffic characteristic (cell delay) of cells inputted to the ATM switch system 6 is shifted from the value corresponding to the predetermined acceptable cell delay.

Like the probability density function described in conjunction with the preceding embodiments, probability density function $d(x)$ of the burst-level delay $x$ of cells in the buffer of the ATM switch system shown in FIG. 1 can be approximated using the following expression.

$$d(x) = d1(x) + d2(x) + d3(x) \quad (24)$$
$$= 3 \cdot C \cdot \beta t \cdot \exp(-3 \cdot \beta t \cdot x) +$$
$$3 \cdot C \cdot \beta t \cdot \gamma \cdot \exp(-3 \cdot \beta t \cdot x) +$$
$$C \cdot \beta t \cdot \gamma \cdot \exp(-\beta t \cdot x)$$

In the expression, $x$ indicates a queue size, C denotes a probability of occurrence of the burst-level queue and is the parameter used in expression (12), $1/\beta t$ is the burst-level delay and is a parameter corresponding to $1/\beta$ of expressions (1) and (12), $\gamma$ is a compensation coefficient to compensate deviation with respect to time caused in the value of cells (queue) accumulated in the buffer due to discrepancy between the burst shape of the approximation theory (the burst occurs instantaneously) and the actual burst shape (the burst occurs with a time width), and $\beta t$ and $\gamma$ are represented as follows.

$$\beta t = \mu t \cdot V \cdot (1-\rho) \quad (25)$$

$$\gamma = (1 - V/\Sigma(Ni \cdot vi)) \cdot \exp(-\beta t \cdot (V/v-1)) \quad (26)$$

Incidentally, $\mu t$ of expression (25) indicates the effective value of delay burst size existing in the exchange and is represented by the following expression.

$$1/\mu t = (1 - v/\Sigma(Ni \cdot vi)) \cdot \quad (27)$$
$$(\Sigma((Ni \cdot <vi>) \cdot (1 + CT)/(2 \cdot \mu i))/\Sigma(Ni \cdot vi)$$

In the density function of expression (24), the first term $d1(x)$ denotes delay due to cell-level collision and the second and third terms $d2(x)$ and $d3(x)$ stand for delays occurred due to burst-level collisions. Additionally, in a zone of a long queue size, the occurrence of delay depends on the third term $d3(x)$, i.e., delay caused by the burst level collision. Drawing the delay distribution represented by expression (24) in a graph with its abscissa and ordinate respectively representing the delay time (logarithmic value) and delay distribution (logarithmic value) in a manner similar to the probability density function of queue size of FIG. 4, the obtained curve becomes a straight line having gradient $\beta t$ and substantially parallel to the probability density function. Gradient $\beta t$ denotes the amount of delay appearing because the cells form a queue in the buffer, and $\beta$ designates the magnitude of the queue size. That is, in a range of a large cell queue size due to a large size of the buffer, the delay of cell corresponds to the queue size.

In consequence, in a range of the buffer size and queue size in which the cell delay and the probability density function of queue represented with straight lines parallel to each other and are corresponded to each other, a short queue size requiring a short observation time is set as an observation point to observe the queue so as to obtain the values of probability of occurrence of the burst-level queue and average burst size $\beta$, thereby achieving a statistic test of the probability density function of queue. As a result, without directly observing the cell delay of the ATM switch system in a case of a long buffer size, the values of cell delay can be attained from the probability density function of cell queue to decides according to the values whether or not the traffic characteristic (cell delay) of cells inputted to the ATM switch system is other than the value corresponding to the predetermined acceptable delay.

For a specific observation point, like in the preceding embodiments, a queue size for which $\beta t \cdot \gamma \cdot \exp(-\beta t \cdot x)$ is substantially equal to one (a possibly short queue size in the range of corresponding queue size in which the cell delay and the probability density function of queue represented with straight lines parallel to each other need only be set as observation point $xt$ of queue size. Once the observation point of queue size is established, only by observing the queue size, the values of probability C of occurrence of the burst-level queue and average burst size $\beta$ can be attained through simple calculations of expressions (18) and (19) described for the preceding embodiments and a statistic test is conducted for the probability density function so as to decide whether or not the traffic characteristic (cell delay) of cells inputted to the TM exchange is other than the value associated with the predetermined acceptable cell loss probability.

Detailed constitution and operation of the ATM switch system 6 according to the present invention will be further described by referring to the drawings.

The ATM switch system 6 according to the present invention is adopted in the network shown in FIG. 17 and is connected to ATM terminals 7 and other ATM networks 5 so as to carry out an exchange operation of ATM cells between the terminals 7, between the networks 5, and/or between the terminals 7 and networks 5.

The ATM switch system 6 includes, as shown in the block configuration diagram of FIG. 18, a switch circuit 610 to accomplish a cell exchange operation between ATM input lines 5a and 7a and ATM output lines 5b and 7b, buffers 160 corresponding to the output lines 5b and 7b to buffer cell collisions due to the statistic multiplexing operation and exchange process and to output the cells therefrom, a CP circuit 50, regulation flag memories 220, underflow testing circuits 260, and queue size counters 280 to observe the queue size of cells in the cell buffers 160. Incidentally, the buffers 160, CPU circuit 50, regulation flag memories 220, underflow testing circuits 260, and queue size counters 280 to observe the queue size of cells in the cell buffers 160 are configured in the same manner as those of the preceding embodiments. Additionally, as the switch circuit 610, there can be used a switch conducting an exchange operation of ordinary ATM cells. In addition to the ordinary ATM cell exchange, the circuit 610 is so configured to communicate the messages shown in FIGS. 19A to 19E between the terminals 7, other networks 5, and CP circuit 50.

In the constitution, when cells are started to be inputted to the ATM switch system 6, the switch circuit 610 conduct the exchange process to distribute cells to be stored in the cell buffers 160 according to the associated destination output lines. The queue size counter 280 is incremented by one when a cell is inputted to the buffer 160 and is decremented by one when the cell is outputted therefrom. The value of the counter 280 is supplied to the underflow testing circuit 260 at a fixed cycle.

On receiving the value of the queue size counter 280, the underflow testing circuit 260 tests in the described method according to the observed values of cell queue size to decide whether or not the distribution of queue size is a distribution which leads to a delay less than the acceptable delay. The concrete operation is the same as that of the underflow testing circuit 260 described for the preceding embodiments. With the regulation flag memory 220 set to ON, when the circuit 260 decides a change of the acceptable value of cell delay to the safety-side delay, the memory 220 is set to OFF. On the other hand, the embodiment is configured without using the overflow testing circuit 240 such that with the memory 220 set to off, when the circuit 260 does not decide the change to the safety side, the flag memory 220 is set to ON.

When the memory 220 is set to ON, the CP circuit 50 executes a call setup process, which will be described later, to decide that any connection demand from the ATM terminals and networks 5 cannot be accepted and sends an overflow message 14 to the demand source so as to stop the new connection process. On the other hand, with the memory 220 set to ON, when the circuit 260 decides and outputs the change to the safety side, the memory 220 is set to OFF, and the CP circuit 50 executes a call setup process, which will be described later, to decide that the connection demands from the ATM terminals and networks 5 can be accepted and sends an underflow message 15 to the demand sources so as to re-start the new connection process.

Referring next to the drawings, description will be given of operation of the call setup process executed by the CP circuit 50 for the ATM switch system 6.

The switch circuit 610 receives via the ATM terminals 7 and the other networks 5 such control messages as the call setup demand message 11, response message 12, and/or release message 13 shows in FIGS. 19A to 19E and then transfer the received messages to the CP circuit 50. When a control message is received by the CP circuit 50, an interruption takes place therein such that the CP circuit 50 executes a process associated with a type of the message, which will be described later.

Figure 20:
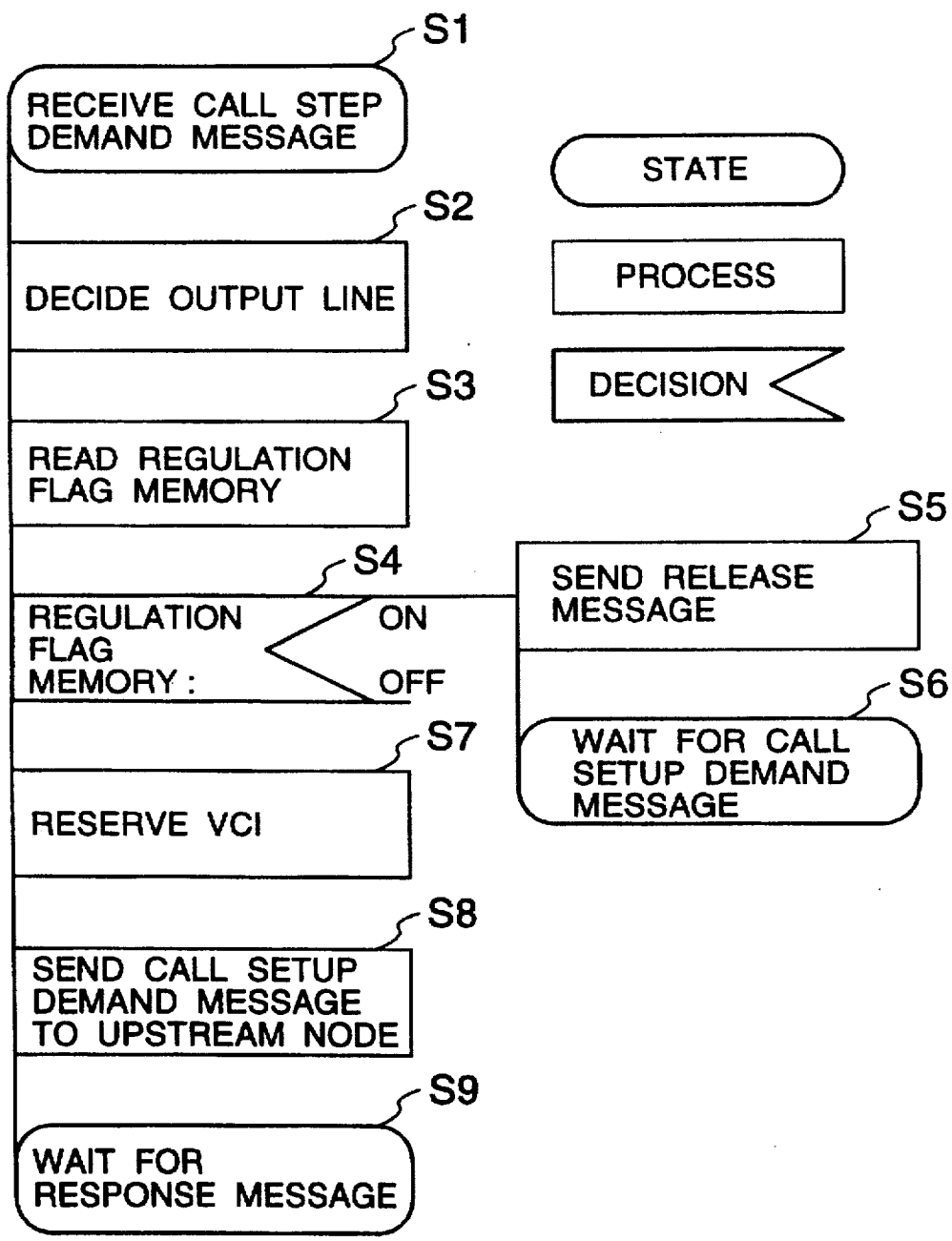
FIG. 20 is an operation flowchart showing the process conducted at reception of a call setting demand message in the ATM switch system according to the present invention.

FIG. 20 is an operation flowchart showing the process executed when the call setup demand message 11 is received. In this regard, meanings of symbols indicating processes or states used in the flowchart are described in FIG. 20, the meanings being commonly applicable to other flowcharts used in the following explanation.

When the call setup demand message 11 is received (S1), an output line is determined (S2), and then an access is made to the regulation flag memory 220 corresponding to the outline to read the value therefrom (S3).

When the obtained value indicates ON, the delay is more than the acceptable delay and hence it is assumed that the connection demand cannot be accepted. When the value indicates OFF, the delay is not deteriorated and hence it is assumed that the connection demand can be accepted (S4). This process is a process in which the ATM switch system 6 accepts the connection demand only when the delay is less than the acceptable delay.

When the demand is decided to be unacceptable, the release message 13 is transmitted (S5), and then the system returns to the call setup demand wait state (S6).

In addition, when the connection demand from the ATM terminal 7 is decided to be acceptable, a VCI for a connection-type communication not allocated is extracted for reservation thereof (S7). After the VCI is reserved, a call setup demand message 11 is generated to be transmitted via the switch circuit section 610 (S8). When the process above is completed, the system enters the accept message wait state (S9) to wait for a response message 12 inputted to the ATM switch system 6.

Figure 21:
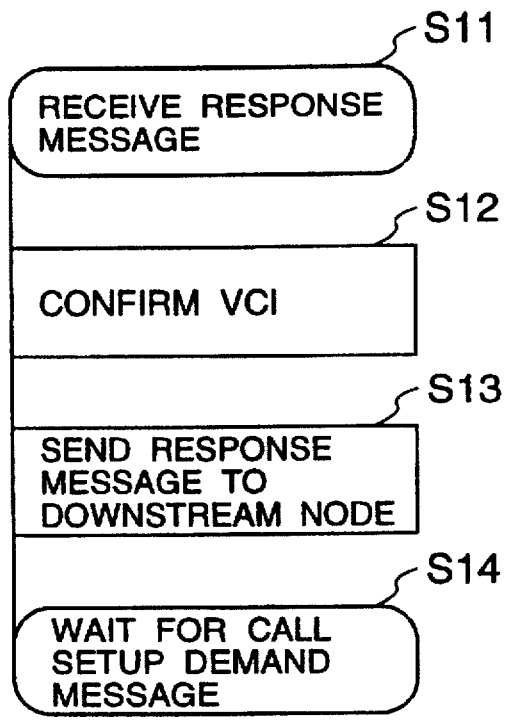
FIG. 21 is an operation flowchart showing the process conducted at reception of a response message in the ATM switch system according to the present invention.

FIG. 21 is an operation flowchart showing the process executed when a response message 12 is received. In this process, when the response message 12 is received (S11), the CP circuit 50 confirms the reserved VCI (S12), returns the response message 12 to the transmission source ATM terminal 7 or network 5 (S13), and then returns to the call setup demand wait state (S14).

Figure 22:
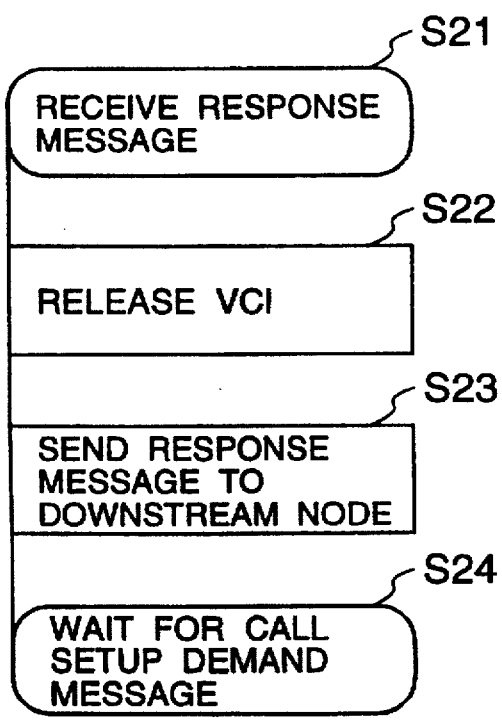
FIG. 22 is an operation flowchart showing the process conducted at reception of a release message in the ATM switch system according to the present invention.

FIG. 22 is an operation flowchart showing the process effected at reception of a release message 13. In this process, when the release message 13 is received (S21), the CP circuit 50 releases the reserved VCI for the release thereof (S22), sends a release message 13 to the demand source (S23), and then returns to the call setup demand wait state (S24).

According to the ATM switch system including the traffic control function of the present invention described for the embodiment above and and the network using the same, the ATM switch system controls acceptance of calls to achieve the traffic control, and hence even when an ATM terminal which cannot report parameters related to traffic is included, it is possible to achieve the traffic control in which the delay of the ATM switch system in the network can be set to a value not exceeding the acceptable delay. In addition, even when the negotiation related to traffic is conducted between the ATM switch systems, terminal, and networks, the traffic control can be collectively conducted by the ATM switch system. Consequently, even when a terminal or network reports an excessive traffic, an available resource can be allocated to other terminals and networks in response to the excessive traffic report and hence there can be carried out the communication with a high network utilization efficiency advantageously developing ATM characteristics.

Moreover, referring to the drawings, description will be given of another mode of embodying the ATM switch system including the traffic control function and the network using the same according to the present invention.

Figure 23:
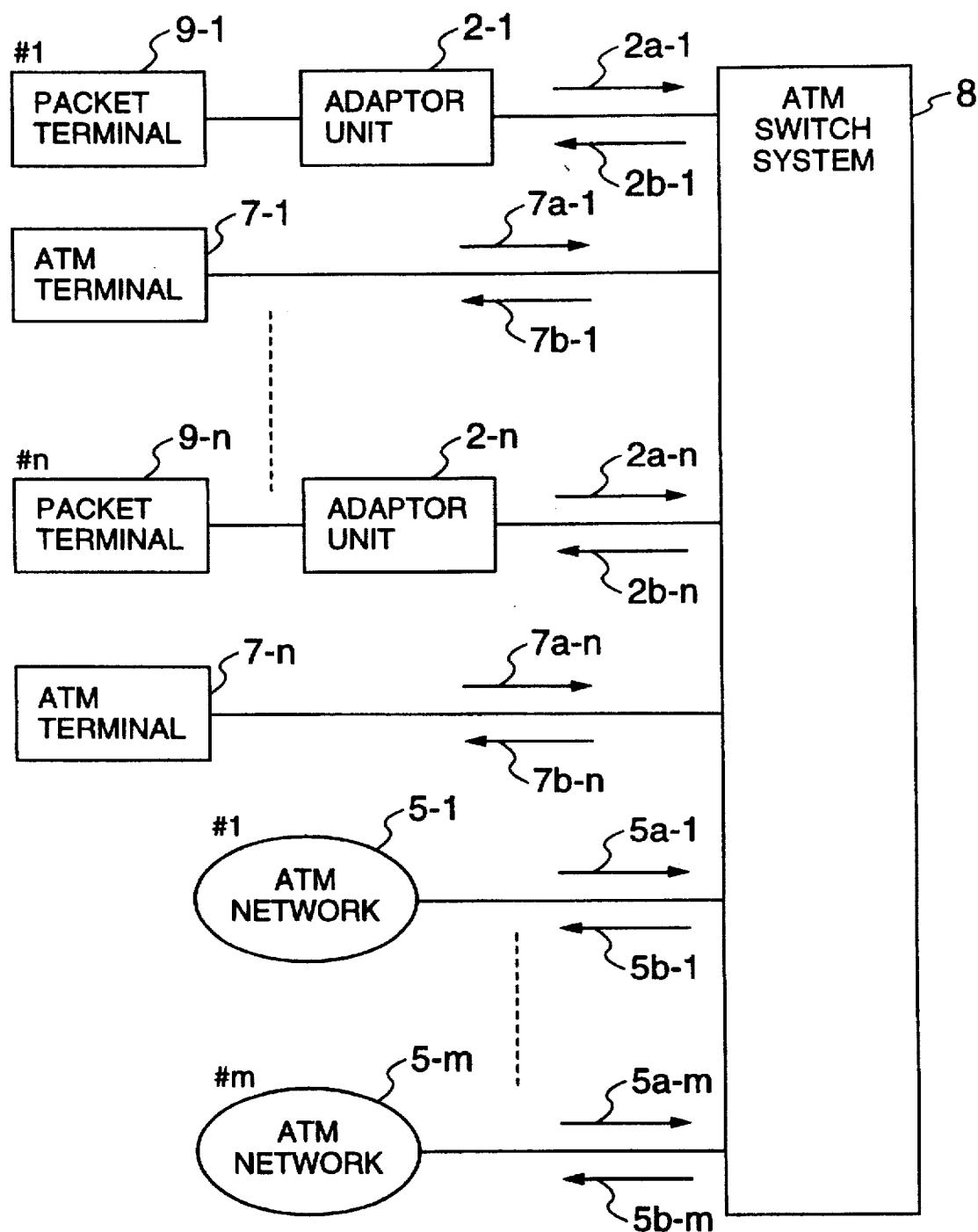
FIG. 23 is a network configuration diagram showing another configuration example of the network adopting the ATM switch system according to the present invention.

FIG. 23 is a network configuration diagram showing the ATM switch system including the traffic control function and the network using the same according to the present invention for the explanation of the embodying mode. In the configuration of the network using an ATM network including connection-type terminals 9 to conduct a connection-type communication and connectionless terminals 7 to achieve a connectionless-type communication, there are included an ATM switch system 8 for the communication exchange between the connection-type and connectionless-type communications and network adaptor devices 2 to connect the connectionless-type terminals 9 to the ATM network. Specifically, the ATM switch system 8 is connected to the terminals of connectionless type such as the ATM terminals 7 and is connected via an adaptor 2 to a connection-type terminal, e.g., a packet terminal 9. Additionally, the ATM switch system 8 is linked with an ATM network 5.

In this embodying mode, when the overflow testing circuit 240 decides an event that the distribution of queue size is shifted due to the traffic related to terminals of connectionless type to a distribution which leads to a loss probability exceeding the acceptable loss probability, there are initiated for connectionless-type terminals 7 a packet read delay control operation to delay transmission of cells therefrom and a burst division control operation to intermittently send cells therefrom, thereby accomplishing the traffic regulation. Furthermore, when the underflow testing circuit 260 determines, during the traffic regulation, occurrence of an event that the distribution of queue size is shifted due to the traffic related to connectionless-type terminals 7 to a distribution which leads to a loss probability less than the acceptable loss probability, the call connection demand is re-started for connection-type terminals 9 and the packet read delay control operation and the burst division control operation for the intermittent cell transmission are stopped for connectionless-type terminals 7.

Through the sequence of operations, there is materialized an ATM switch system in which the average cell rate and burst size of the traffic of the ATM switch system is controlled to be processed by the ATM switch system, thereby conducting the control operation to recover the cell loss probability thereof to the acceptable cell loss rate.

Figure 24:
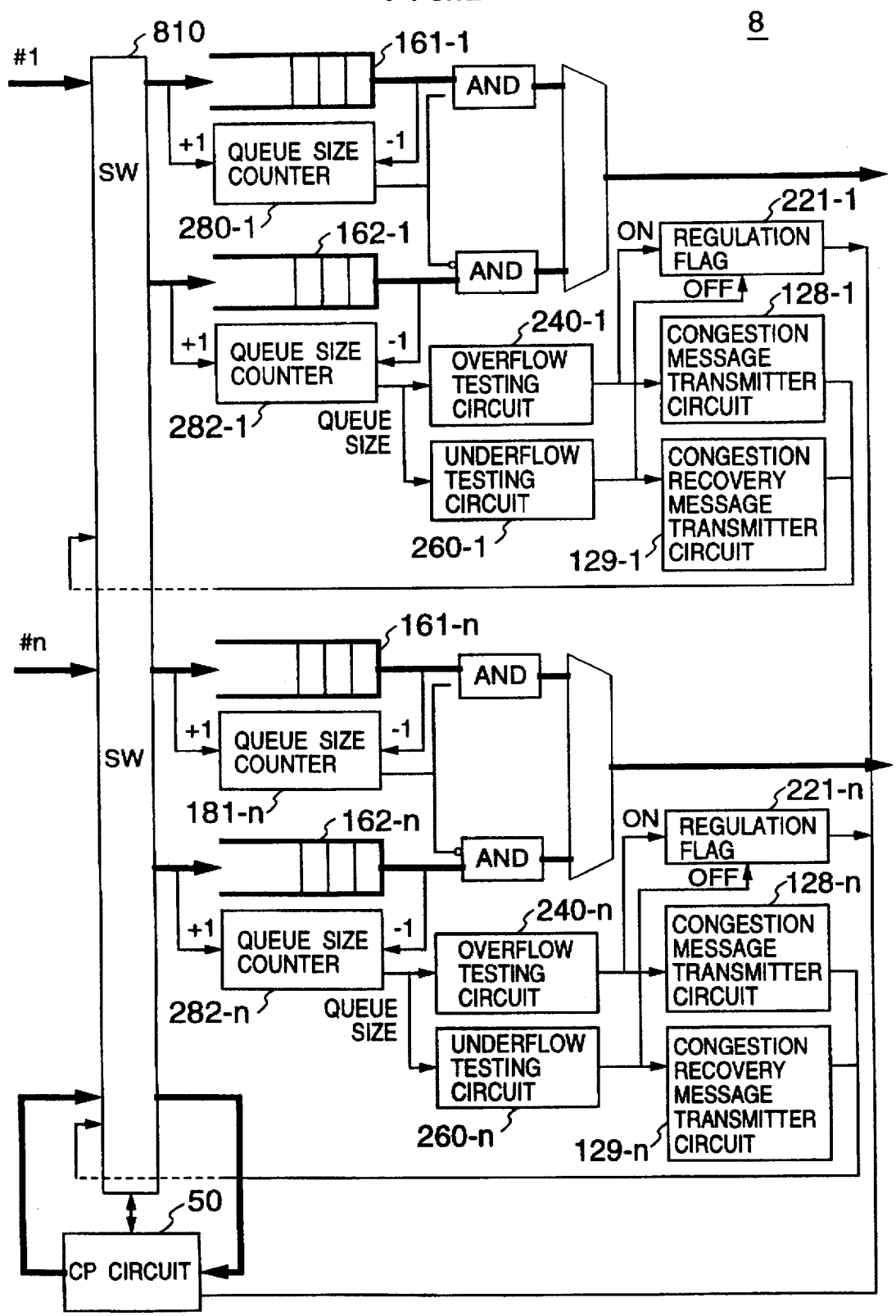
FIG. 24 is a block configuration diagram showing the construction of another ATM switch system applied to another network according to the present invention.

FIG. 24 is a block configuration diagram showing another structure of the ATM switch system 8 according to the present invention. The ATM switch system 8 includes two types of cell buffers 161 and 162, a switch circuit 810 accommodating ATM input and output lines to achieve a switch process to distribute cells according to the VCI of each ATM cell to the cell buffers 161 and 162 disposed for the respective output lines, and a CP circuit 50.

In this structure, the cell buffers 161 and 162 are arranged in a duplicated structure to avoid collisions between cells associated with the exchange process so as to send the cells to the ATM network 5. The cell buffer 161 is related to the traffic of the connection-type terminals 9, namely, any cell present therein is read therefrom in any situation, whereas, the cell buffer 162 is related to the traffic of connectionless-type terminals 7 and is used only when the traffic from connection-type terminals 9 is absent in the cell buffer 161.

Moreover, in addition to the configuration above, there are included congestion message delivery circuits 128, congestion recovery message delivery circuits 129, overflow testing circuits 240, underflow testing circuits 260, and queue size counters 282 to observe the queue size of cells in cell buffers 162 for the traffic from connectionless-type terminals 7. Incidentally, in this constitution, the overflow testing circuits 240, underflow testing circuits 260, and the CP circuit 59 are the same as the preceding embodiments. In addition, although the switch circuit 810, buffers 161 and 162, and queue size counter 181 are assigned with different reference numerals because of different operations as compared with those of the preceding embodiments, the configurations thereof are the same as the switch circuit 610, buffer 160, and queue size counter 160 employed in the preceding embodiments.

The CP circuit 50 operates in the structure such that when a terminal issued a connection demand in a situation in which the cell loss probability or delay associated with the value of queue size is equal to or less than the acceptable cell loss probability or delay, the CP circuit 50 allows the connection for the terminal. Moreover, there is additionally provided a process in which a call from a connection-type terminal 9 is accepted only when the distribution of queue size is less than a distribution leading to a cell loss probability less than the acceptable cell loss probability in the cell buffer 162 to buffer the traffic from connectionless-type terminals 7.

In this regard, when the overflow testing circuit 240 decides a traffic abnormality, the congestion message delivery circuit 128 delivers the overflow message 14 shown in FIG. 19D to a network adaptor 2, which will be described later, and notifies activation of the packet read delay circuit 180 in the adaptor 2 and the burst division control circuit 200 of the adaptor 2 to intermittently conduct the cell transmission. When the underflow testing circuit 260 decides a traffic abnormality, the congestion message delivery circuit 129 delivers the underflow message 15 shown in FIG. 19E to a network adaptor 2 to stop operation of the packet read delay circuit 180 and the burst division control circuit 200.

Figure 25:
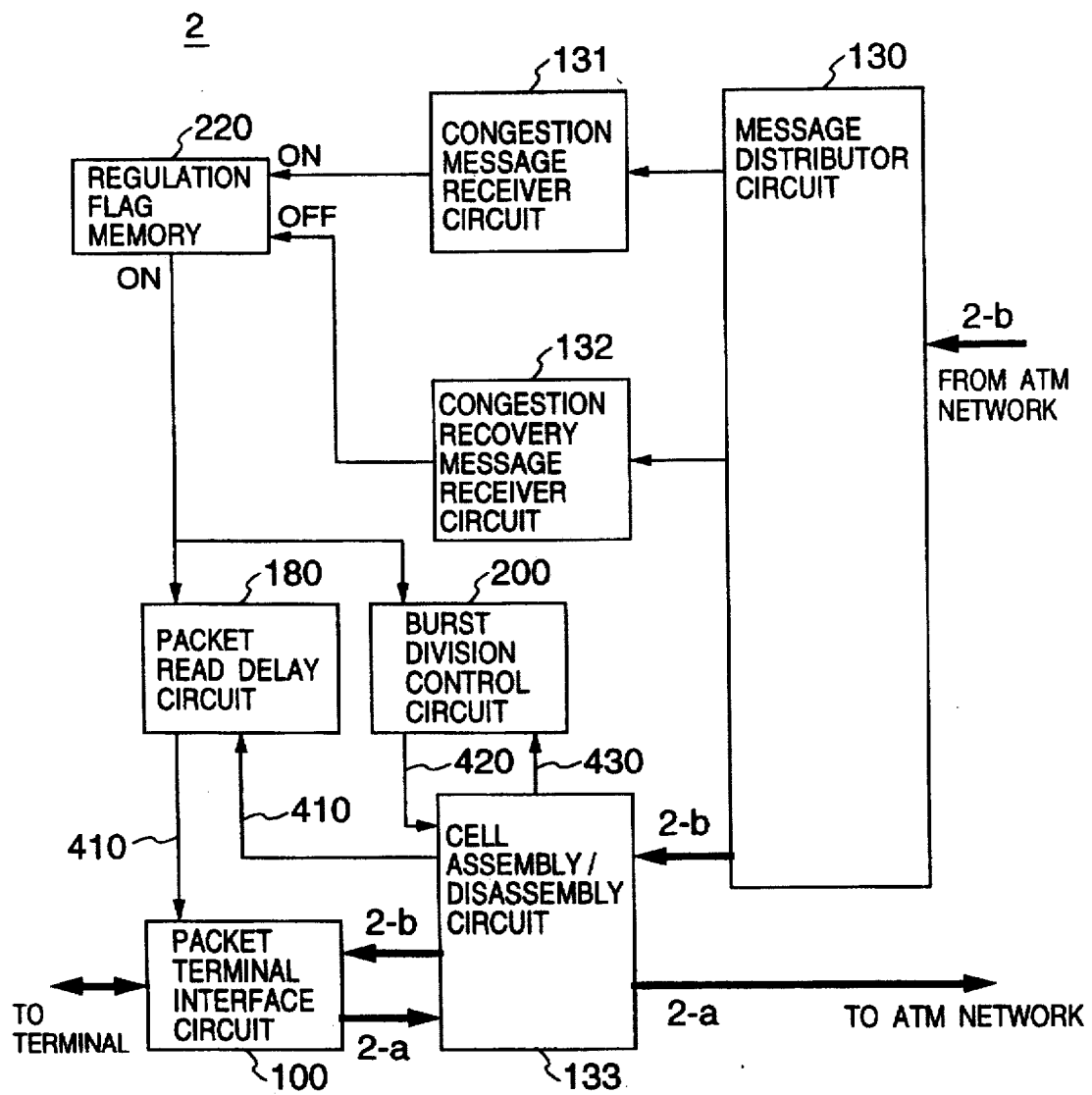
FIG. 25 is a block configuration diagram showing the construction of a trunk apparatus applied to another network according to the present invention.

FIG. 25 is a block construction diagram showing the structure of the network adaptor 2. The adaptor 2 is an apparatus which transforms packets from packet terminals 9 into cells to conduct a statistical multiplexing operation for the cells so as to send the cells via the ATM switch system 8 to the ATM network 5 and which includes a packet terminal interface circuit 100, a message distributor circuit 130, a cell assembly/disassembly circuit 133, an ATM output line 2a, and an ATM input line 2b. In the constitution, the packet terminal interface circuit 100 sends, in the packet input operation, packets from the packet terminals 9 to the cell assembly/disassembly circuit (CLAD) circuit 133 and transmits, in the packet output operation, packets from the CLAD 133 to packets terminals 9. Additionally, the message delivery circuit 130 discriminates the control messages shown in FIGS. 19A to 19E from the user messages used in the ordinary communication.

Moreover, a congestion message receiver circuit 131, a congestion recovery message receiver circuit 132, a packet read delay circuit 180, a burst division control circuit 200, and a regulation flag resistor 220 are disposed in the above configuration to control the CLAD 133. In this connection, the packet read delay circuit 180, burst division control circuit 200, and regulation flag register 220 are the same as those described in conjunction with the previous embodiments.

Figure 26:
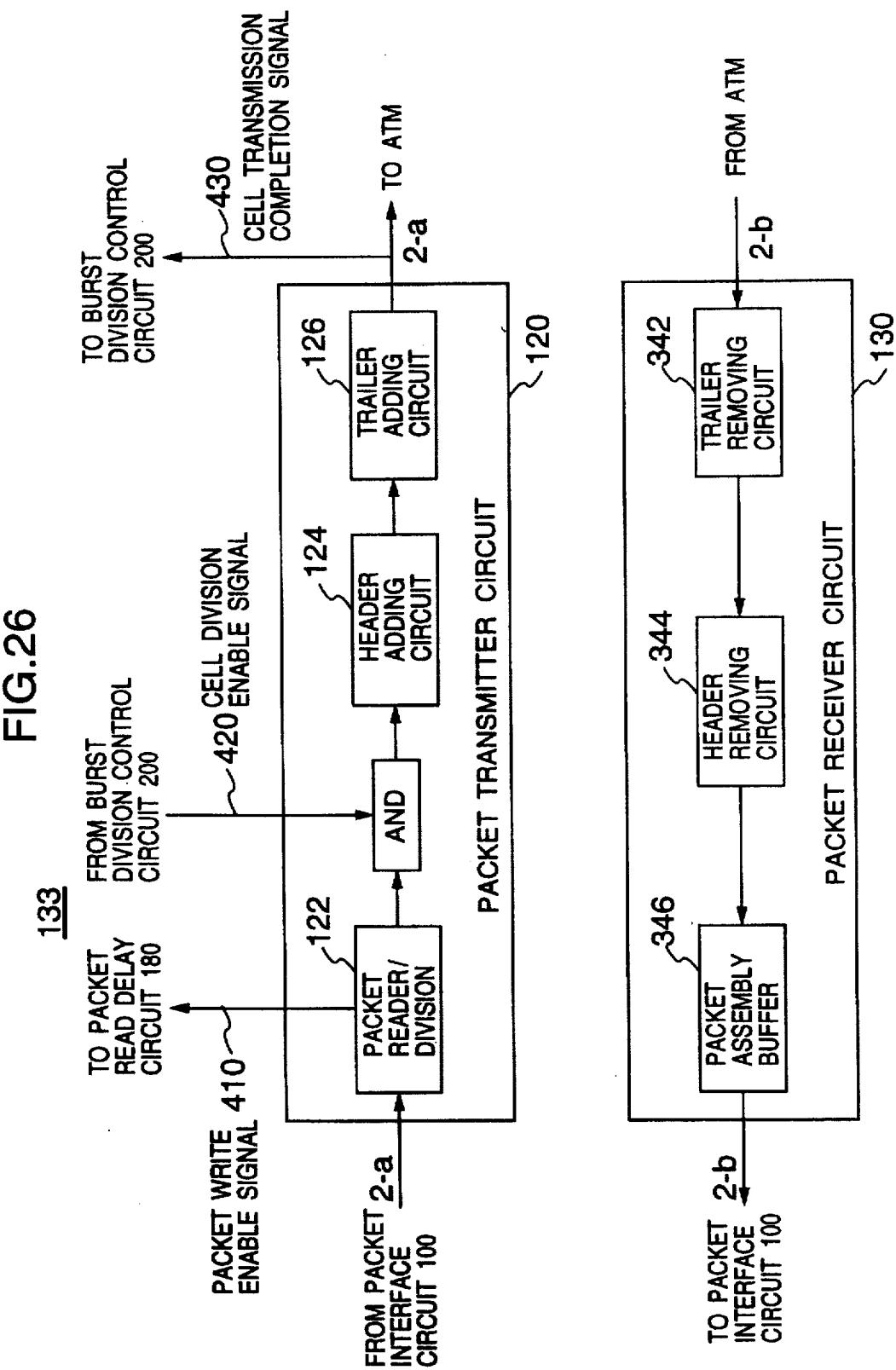
FIG. 26 is a block configuration diagram showing the configuration of a cell assembly and disassembly device (CLAD) employed in the trunk apparatus according to the present invention.

FIG. 26 is a block configuration diagram showing the constitution of the CLAD 133. The CLAD 133 includes a packet transmission circuit 120 and a packet reception circuit 340 which are the same as those described in relation to the above embodiments; furthermore, the connections of a packet read delay circuit 180 and a burst division control circuit 200 are also the same as those of the ATM switch system 1 shown in the embodiments above.

In the construction described above, the operation thereof is substantially identical to that of the above embodiments in which when cells are started to be supplied to the ATM switch system, the switch circuit 810 executes the switch operation to distribute cells from connection-type terminals 9 to cell buffers 161 and cells from connectionless-type terminals 7 to cell buffers 162. If any cell is present in the cell buffer 161 for the traffic from connection-type terminals 9, the cell is transmitted therefrom in any situation. In this operation, the cell transmission is not conducted for the cell buffer 162. When the cell buffer 161 becomes empty, the cell transmission is conducted for the cell buffer 162.

Each time a cell is supplied to the cell buffer 162, the queue size counter 282 is incremented by one, whereas each time a cell is read therefrom, the counter 282 is decremented by one. The value of the counter 282 is supplied to the overflow and underflow testing circuit 240 and 260 at a fixed cycle. The overflow testing circuit 240 statistically conducts a statistical test for occurrence of an event that the frequency distribution of queue size value 282 is shifted to a dangerous side leading to a cell loss probability exceeding the acceptable cell loss probability. The underflow testing circuit 260 statistically conducts a statistical test for occurrence of an event that the frequency distribution is shifted to a safe side leading to a cell loss probability less than the acceptable cell loss probability.

Furthermore, when the average cell rate or burst size of the traffic from the terminals exceeds the value acceptable for the process of the ATM switch system 8 because the interval between the packet transmissions from the terminals is decreased and the packet size of packets from the terminals is increased, a congestion message 14 is sent, after the shift to the dangerous side is determined by the overflow testing circuit 240, to the network adaptor 2 from the congestion message delivery circuit 128 to activate the packet read delay control circuit 180 and burst division control circuit 200 of the network adaptor 2. At the same time, the regulation flag memory 220 is set to ON to activate the call setup process such that the connection demand from the connection-type terminal 9 is judged to be unacceptable to stop the additional connection.

After the traffic regulation demand is issued to the network adaptor 2, when the average cell rate and quantity of burst length of the traffic from connectionless-type terminals 9 become less than the acceptable for the ATM switch system 8, the congestion recovery message 15 is sent from the congestion recovery message delivery circuit 129 to the network adaptor 2, after the underflow testing circuit 260 decided occurrence of the shift to the safe side, thereby terminating operations of the packet read delay circuit 180 and burst division control circuit 200. Simultaneously, the regulation flag memory 220 is set to OFF and the call setup process is invoked to assume the connection demand from a connection-type terminal 9 to be acceptable so as to re-start the additional connection.

Figure 27:
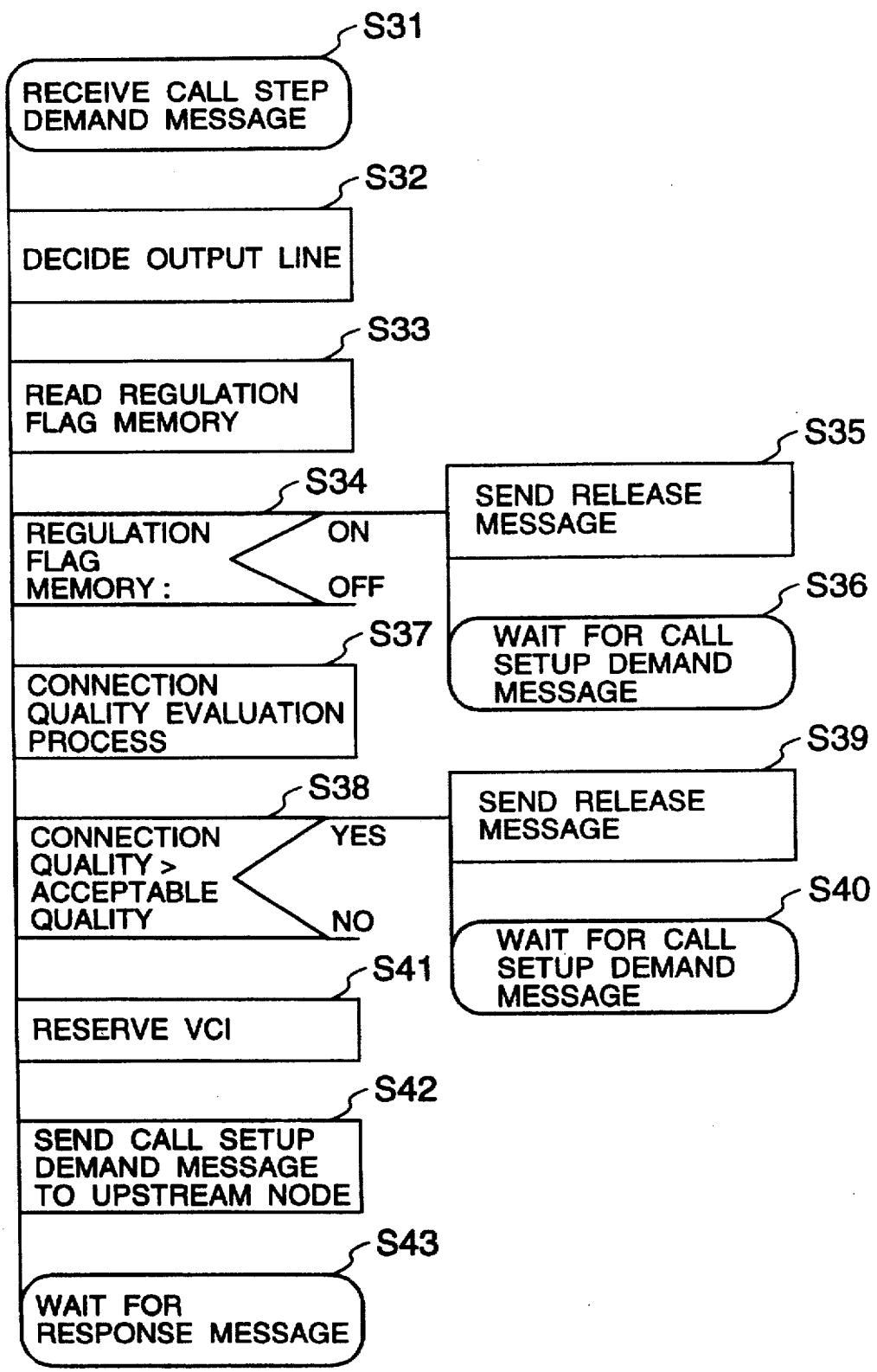
FIG. 27 is an operation flowchart showing the process conducted at reception of a call setting demand message in the ATM switch system according to the present invention.

FIG. 27 is an operational flowchart showing operation of the call setup process. The operation ranging from reception (S31) of the call setup demand message 11 to judgement (S34) of the regulation flag memory 220 as well as the regulational operations (S35) and (S36) related to the connectionless-type terminals 7 are the same as the above operation ranging from steps (S1) to (S6) of FIG. 20. Additionally, this also applies to the operation in which the connection demand from the connection-type terminal is assumed to be acceptable (S34) when the value of regulation flag memory 220 is OFF.

When the connection demand is acceptable, the connection quality (loss probability and delay quantity) of connection-type terminals are evaluated according to the output line capacity, cell buffer for connection-type traffic, and traffic parameters declared by the pertinent terminal (S37) to thereby decide whether or not the connection demand is acceptable for the associated output line (S38).

When the connection quality is more than the acceptable quality and hence it is decided that the demand is unacceptable, the release message 11 is transmitted (S39) and then the process returns to the call setup demand wait state (S40). On the other hand, the operation ranging from reservation of VCI (S41) when the demand is judged to be acceptable to transfer to the receive message wait state (S43) is the same as that ranging from steps S7 to S9 of the above description of FIG. 20.

In addition, the operations at reception of the response message 12 and release message 13 are the same as those described above in relation to FIGS. 21 and 22.

When the network adaptor 2 receives the congestion message 14 and the congestion recovery message 15, the congestion message reception circuit 131 and congestion recovery message reception circuit 132 respectively set the regulation flag memory 220 to ON and OFF, respectively. The control operations thereafter of the packet read delay circuit 180 and burst division control circuit 200 are the same as those of the ATM switch system 1 described in the embodiments above, namely, the traffic characteristic of packets of connectionless type is controlled.

According to the ATM switch system including the traffic control function of the present invention described in conjunction with the embodiments above and the network using the same, even when the burst traffic flow rate and characteristic of terminals of connection-less type are dynamically altered, the ATM switch system modifies, without conducting any negotiation with the packet terminals, the traffic cell characteristic of cells supplied thereto to be acceptable for the process thereof so as to set the cell discarding probability to be equal to or less than the acceptable cell loss probability. Therefore, the terminal is not necessarily required to declare the ATM traffic characteristic before starting communication and hence is enabled to accomplish the connectionless communication similar to that of the conventional LAN. In addition, since the the negotiation related to the traffic characteristic is not required to be conducted between the ATM-LAN and the ATM switch system, any packet terminal of connectionless type connectible to the conventional LAN can be connected to the network without modifying the software of the terminal for the ATM network.

The ATM switch system including the traffic control function of the present invention and the network using the same as described in conjunction with the embodiments above will yields various advantages as follows.

When the ATM switch system conduct the statistical multiplexing operation, even when the flow rate and characteristic of the burst traffic from the terminals are changed, since the flow rate and characteristic of the burst traffic from the terminals are adaptively modified to be processed by the ATM switch system, there can be easily constructed an ATM switch system reducing the cell loss probability to be equal to or less than the acceptable cell loss probability and a network using the same.

Additionally, since the ATM switch system is so configured to control the traffic characteristic, any terminal need not declare the traffic characteristic and there can be achieved the statistical multiplexing operation for communication of connectionless type.

Furthermore, in association with the control operations of the flow rate and characteristic of the burst traffic from terminals connected to the packet network, since the traffic control is carried out by the ATM independently of the terminals in the configuration, the traffic control can be effected also for the terminals not supporting the traffic control function.

In addition, since the negotiation related to the traffic characteristic is not necessary between the ATM network and the terminals, when a connection is established between packet networks via the ATM network, the software of the terminals connected to the packet network is not required to be modified for the ATM network, thereby configuring an economical network.

We claim:

1. An ATM switch system for receiving as inputs thereto cells of a plurality of kinds having respectively different traffic characteristics and conducting a multiplexing process for exchange of the cells, comprising:

a buffer to accumulate therein cells undergone collisions among the plural input cells of the ATM switch system; and traffic control means, wherein said traffic control means comprises:

means for observing a queue size of cells in the buffer, testing means for statistically testing, according to observed values of the queue size, whether or not a cell loss occurring in the exchange exceeds an upper limit value of an acceptable cell loss probability, overflow testing means for outputting therefrom, according to a result of the test, a traffic regulation alert start signal of the input cell, and change means for changing the traffic characteristic of the input cell.

2. An ATM switch system according to claim 1, wherein the overflow testing means includes:

means for statistically testing to decide whether or not a frequency of an event in which the observed value of the queue size is more than a predetermined threshold value exceeds an upper limit of an acceptable frequency value;

means for statistically testing whether or not an average of the observed values which are more than the threshold value exceeds an upper limit of an acceptable average value; and means for outputting therefrom a traffic regulation start signal when the acceptable frequency value or the acceptable average value is exceeded as a result of the test.

3. An ATM switch system for receiving as inputs thereto cells of a plurality of kinds having respectively different traffic characteristics and conducting a multiplexing process for exchange of the cells, comprising a buffer to accumulate therein cells undergone collisions the plural input cells of the ATM switch system and traffic control means, wherein said traffic control means includes:

means for observing a queue size of cells in the buffer;

testing means for statistically testing, according to an observed value of the queue size, whether or not a cell loss occurring in the exchange is less than an upper limit value of an acceptable cell loss probability and underflow testing means for outputting therefrom, according to a result of the test, a traffic regulation stop signal of the input cell; and change means for changing the traffic characteristic of the input cell.

4. An ATM switch system according to claim 3, wherein the underflow testing means includes:

means for statistically testing to decide whether or not a frequency of an event in which the observed value of the queue size is more than a predetermined threshold value is less than a lower limit of an acceptable frequency value;

means for statistically testing whether or not an average of the observed values which are more than the threshold value is less than a lower limit of an acceptable average value; and means for outputting therefrom a traffic regulation start signal when the acceptable frequency value or the acceptable average value is greater as a result of the test.

5. An ATM switch system for receiving as inputs thereto cells of a plurality of kinds having respectively different traffic characteristics and conducting a multiplexing process for exchange of the cells, comprising a buffer to accumulate therein cells undergone collisions the plural input cells of the ATM switch system and traffic control means, wherein said traffic control means includes:

means for observing a queue size of cells in the buffer;

testing means for statistically testing, according to an observed value of the queue size, to whether or not a cell delay occurring in the exchange exceeds an upper limit value of an acceptable cell delay and overflow testing means for outputting therefrom, according to a result of the test, a traffic regulation start signal of the input cell; and means for controlling a cell input interruption of the exchange.

6. An ATM switch system for receiving as inputs thereto cells of a plurality of kinds having respectively different traffic characteristics and conducting a multiplexing process for exchange of the cells, comprising a buffer to accumulate therein cells undergone collisions the plural input cells of the ATM switch system and traffic control means, wherein said traffic control means includes:

means for observing a queue size of cells in the buffer;

testing means for statistically testing, according to an observed value of the queue size, whether or not a cell delay occurring in the exchange is less than a lower limit value of an acceptable cell delay and underflow testing means for outputting therefrom, according to a result of the test, a traffic regulation stop release signal of the input cell; and means for controlling a cell input operation of the exchange.

7. An ATM multiplexing apparatus including means connected to a variable-length packet line and an ATM line for terminating the variable-length packet line, means for disassembling a variable-length packet into ATM cells, means for assembling ATM cells into a variable-length packet, means for multiplexing ATM cells, and a buffer for accumulating therein the multiplexed ATM cells, comprising a cell division control circuit including:

a queue size counter for counting a queue size of cells created in the buffer;

overflow testing circuit including means for statistically testing, according to a plurality of count values of the queue size counter, whether or not a cell loss probability in the apparatus exceeds an upper limit of an acceptable cell loss probability and means for outputting a traffic regulation start signal when the cell loss probability exceeds the upper limit of the acceptable cell loss probability as a result of the test;

underflow testing circuit including means for statistically testing, according to a plurality of count values of the queue size counter, whether or not a cell loss probability in the apparatus is less than a lower limit of an acceptable cell loss probability and means for outputting a traffic regulation release signal when the lower limit of the acceptable cell loss probability is greater as a result of the test;

means operative when the overflow testing circuit outputs the traffic regulation start signal for invoking, after the variable-length packets under disassembly are completely processed, a process of stopping for a certain period of time an output of a packet input enable signal from the ATM multiplexing apparatus to the variable-length packet line; and means for stopping the output of the packet input enable signal when the underflow testing circuit outputs the traffic regulation stop signal.

8. An ATM multiplexing apparatus having convertor means for terminating a variable-length packet line and effecting conversions between a variable-length packet and ATM cells and a buffer for statistically demultiplexing ATM cells and accumulating therein the multiplexed ATM cells, comprising a cell division control circuit including:

a queue size counter for counting a queue size of cells created in the buffer;

overflow testing circuit including means for statistically testing, according to a plurality of count values of the queue size counter, whether or not a cell loss probability in the apparatus exceeds an upper limit of an acceptable cell loss probability and means for outputting a traffic regulation start signal when the cell loss probability exceeds the upper limit of the acceptable cell loss probability as a result of the test;

underflow testing circuit including means for statistically testing, according to a plurality of count values of the queue size counter, whether or not a cell loss probability in the apparatus is less than a lower limit of an acceptable cell loss probability and means for outputting a traffic regulation release signal when the cell loss probability is less than the lower limit of the acceptable cell loss probability as a result of the test;

means operative when the overflow testing circuit outputs the traffic regulation start signal for invoking, after a predetermined number of cells are acquired from the variable-length packet, a process of stopping for a certain period of time the cell acquisition; and means for releasing the process of stopping the cell acquisition for a predetermined period of time when the underflow testing circuit outputs the traffic regulation stop signal.

9. An ATM multiplexing apparatus having a queue size counter for counting a queue size of cells through a statistical multiplexing process, comprising:

overflow testing circuit including means for statistically testing, according to a plurality of count values of the queue size counter, whether or not a cell loss probability in the apparatus exceeds an upper limit of an acceptable cell loss probability and means for outputting a traffic regulation start signal when a delay exceeds an acceptable delay as a result of a statistical test;

underflow testing circuit including means for statistically testing, according to a plurality of count values of the queue size counter, whether or not a cell loss probability in the apparatus is less than a lower limit of an acceptable cell loss probability and means for outputting a traffic regulation release signal when the delay is less than the acceptable value as a result of the test; and connection management control means including means for stopping a process of accepting a connection demand when the overflow testing circuit outputs the traffic regulation start signal and means operative when the underflow testing circuit outputs a traffic regulation release signal for restarting the process of accepting a connection demand of connection-type communication.

10. An ATM switch system having a buffer for connection-type communication from which any cell existing therein is read in any situation, a buffer for connectionless-type communication from which a cell is read only when the buffer for connection-type communication is empty, and a queue size counter for counting a queue size of cells in the buffer for connectionless-type communication, comprising:

overflow testing circuit including means for statistically testing, according to a plurality of count values of the queue size counter, whether or not a cell loss probability in the apparatus exceeds an upper limit of an acceptable cell loss probability and means for outputting a traffic regulation start signal when the cell loss probability exceeds the upper limit of the acceptable cell loss probability as a result of the test;

underflow testing circuit including means for statistically testing, according to a plurality of count values of the queue size counter, whether or not a cell loss probability in the apparatus is less than a lower limit of an acceptable cell loss probability and means for outputting a traffic regulation release signal when the cell loss probability is less than the lower limit of the acceptable cell loss probability as a result of the test; and connection management control means including means for stopping a process of accepting a connection demand of connection-type communication when the overflow testing circuit outputs the traffic regulation start signal and means operative when the underflow testing circuit outputs a traffic regulation release signal for restarting the process of accepting the connection demand of connection-type communication.

11. An ATM switch system including a congestion message delivery circuit, a congestion restoration message delivery circuit, and and a queue size counter for counting a queue size of cells generated in an output buffer through a statistical multiplexing process, comprising:

overflow testing circuit including means for statistically testing, according to a plurality of count values of the queue size counter, whether or not a cell loss probability in the apparatus exceeds an upper limit of an acceptable cell loss probability and means for outputting a traffic regulation start signal when the cell loss probability exceeds the upper limit of the acceptable cell loss probability as a result of the test;

underflow testing circuit including means for statistically testing, according to a plurality of count values of the queue size counter, whether or not a cell loss probability in the apparatus is less than a lower limit of an acceptable cell loss probability;

means for outputting a traffic regulation release signal when the cell loss probability is less than the lower limit of the acceptable cell loss probability as a result of the test; and a congestion control circuit including means for activating the congestion message delivery circuit when the overflow testing circuit outputs the traffic regulation start signal and means operative when the underflow testing circuit outputs a traffic regulation release signal for activating the congestion recovery message delivery circuit.

12. A network adaptor for connecting a variable-length packet terminal including a congestion message receiving circuit and a congestion recovery message receiving circuit to an ATM network, comprising a cell division control circuit including:

means operative when the congestion message receiving circuit receives a congestion message for invoking, after variable-length packets in disassembly are completely processed, a process of stopping for a certain period of time an output of a packet input enable signal from the network adaptor to a variable-length packet line; and means operative when the congestion recovery message receiving circuit receives a congestion recovery message for releasing the process of stopping the output of the packet input enable signal.

13. A network adaptor for connecting a variable-length packet terminal having a congestion message receiving circuit and a congestion recovery message receiving circuit to an ATM network, comprising a cell division control circuit including:

means operative when the congestion message receiving circuit receives a congestion message for invoking, after a certain number of cells are acquired from the variable-length packet, a process of stopping the cell acquisition for a certain period of time and means operative when the congestion recovery message receiving circuit receives a congestion recovery message for releasing the process of stopping the cell acquisition for a certain period of time.

* * * * *